US009710383B1

(12) United States Patent
Xu et al.

(10) Patent No.: US 9,710,383 B1
(45) Date of Patent: Jul. 18, 2017

(54) CACHING TECHNIQUES

(71) Applicant: EMC IP Holding Company LLC, Hopkinton, MA (US)

(72) Inventors: Xinlei Xu, Beijing (CN); Liam Xiongcheng Li, Beijing (CN); Jian Gao, Beijing (CN); Vamsi Vankamamidi, Brookline, MA (US); Jigang Wang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/868,512

(22) Filed: Sep. 29, 2015

(51) Int. Cl.
  *G06F 12/00* (2006.01)
  *G06F 12/0831* (2016.01)
  *G06F 12/02* (2006.01)
  *G06F 12/122* (2016.01)
  *G06F 12/128* (2016.01)

(52) U.S. Cl.
  CPC ...... *G06F 12/0833* (2013.01); *G06F 12/0246* (2013.01); *G06F 12/122* (2013.01); *G06F 12/128* (2013.01); *G06F 2212/222* (2013.01); *G06F 2212/311* (2013.01); *G06F 2212/62* (2013.01); *G06F 2212/69* (2013.01); *G06F 2212/7201* (2013.01)

(58) Field of Classification Search
  CPC .. G06F 12/00; G06F 12/0238; G06F 12/0246; G06F 12/0253
  USPC .................. 711/100, 103, 154, 200
  See application file for complete search history.

(56) References Cited

U.S. PATENT DOCUMENTS

| 8,135,928 B2 * | 3/2012 | Ozdemir ............ G06F 11/2082 711/114 |
| 9,355,109 B2 * | 5/2016 | Archak ............ G06F 17/30132 |
| 9,442,858 B2 * | 9/2016 | Ghodsnia ............ G06F 12/0866 |
| 9,473,424 B2 * | 10/2016 | Singh .................... H04L 49/351 |
| 2011/0022801 A1 * | 1/2011 | Flynn ........................ G06F 9/52 711/120 |

OTHER PUBLICATIONS

EMC Corporation, "VNX® FAST Cache", VNX5100, VNX5300, VNX5700, & VNX7500, White Paper, Dec. 2013, 25 pps.

* cited by examiner

*Primary Examiner* — Tuan Thai
(74) *Attorney, Agent, or Firm* — Muirhead and Saturnelli, LLC

(57) ABSTRACT

Described are techniques for cache management that may include determining whether to flush dirty cached data included in a flash disk cache. Caching layer may include the flash disk cache as a secondary cache and another cache as a primary cache. Responsive to determining to flush dirty cache data from the flash disk cache, first processing may be performed that includes flushing dirty cached pages from the flash disk cache to one or more physical storage devices. The dirty cached pages may include data from a plurality of logical addresses of a first device. The logical address may be sorted and included in a sorted list. Flushing may include writing the plurality of dirty cached pages in an ordering in accordance with the sorted list.

19 Claims, 14 Drawing Sheets

CACHING TECHNIQUES

BACKGROUND

Technical Field

This application generally relates to caching.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host may perform a variety of data processing tasks and operations using the data storage system. For example, a host may perform basic system I/O (input/output) operations in connection with data requests, such as data read and write operations.

Host systems may store and retrieve data using a data storage system containing a plurality of host interface units, disk drives (or more generally storage devices), and disk interface units. Such data storage systems are provided, for example, by EMC Corporation of Hopkinton, Mass. The host systems access the storage devices through a plurality of channels provided therewith. Host systems provide data and access control information through the channels to a storage device of the data storage system and data of the storage device is also provided from the data storage system to the host systems also through the channels. The host systems do not address the disk drives of the data storage system directly, but rather, access what appears to the host systems as a plurality of files, objects, logical units, logical devices or logical volumes. These may or may not correspond to the actual physical drives. Allowing multiple host systems to access the single data storage system allows the host systems to share data stored therein.

SUMMARY OF THE INVENTION

In accordance with one aspect of the invention is a method of performing cache management comprising: determining whether to flush dirty cached data included in a flash disk cache, wherein a plurality of caching layers includes the flash disk cache as a secondary cache and another cache as a primary cache; and responsive to determining to flush dirty cache data from the flash disk cache, performing first processing including: flushing a plurality of dirty cached pages from the flash disk cache to one or more physical storage devices, wherein said plurality of dirty cached pages include data from a plurality of logical addresses of a first device, wherein the plurality of logical addresses are sorted in any of an increasing and decreasing order and included in a sorted list, and wherein said flushing includes writing the plurality of dirty cached pages in an ordering in accordance with the sorted list. The primary cache may be a form of storage having a relatively faster performance than the flash disk cache and wherein the flash disk cache may have a relatively faster performance than the one or more physical storage devices. The first device may be a first logical device having its data stored on at least one of the one or more of the physical storage devices. At least two of the plurality of dirty cached pages may include data for at least two of the plurality of logical addresses which are consecutive. Flushing may include combining the at least two dirty cached pages into a single write operation that writes the at least two dirty cached pages to at least one of the one or more physical storage devices. Flushing may be performed using the sorted list and a second list of dirty cached pages for the first device and the second list may denote an ordering of cached pages for the first device based on time since last accessed. Each entry in the sorted list may be included in the second list, and the second list may include dirty cached pages for the first device and also clean cached pages for the first device. Flushing may include selecting a first dirty cached page from the sorted list based on a position of the dirty cached page in the second list. The sorted list may be used to determine whether the first dirty cached page is combinable with one or more other dirty cached pages included in the sorted list. The first dirty cached page may be determined as combinable with a second dirty cached page. The first dirty cached page may have a first of the plurality of logical addresses and the second dirty cached page having a second of the plurality of logical addresses, and the first logical address and the second logical address may be consecutive logical addresses of the first device. A data portion of the first device may be stored in the flash disk cache in accordance with I/O activity directed the data portion being at least a threshold level. A write operation directed to a logical address of the first device may be received resulting in write data being stored in the primary cache and the write data not being stored in the flash disk cache because I/O activity directed to the logical address is not at least the threshold level. The logical address may be mapped to corresponding physical storage location on a first of the one or more physical storage devices. The method may include receiving a set of one or more other write operations directed to the logical address; determining that I/O activity directed to the logical address is any of equal to or above the threshold level; and responsive to said determining, promoting the write data for the logical device from the first physical storage device to the flash disk cache wherein the write data is stored in the flash disk cache. A first write operation may be received at the flash disk cache, and the first write operation may be directed to a first target location on the first device. Flushing may include performing a second write operation that combines write data written by the first write operation with one or more of the plurality of dirty cached pages into a single write performed by the second write operation that writes to any of the one or more physical storage devices, said flushing including performing the second write operation. A first read operation may be received at the flash disk cache. The first read operation may read data from a first read location on the first device. Flushing may include performing a first write operation that combines read data of the first read location with one or more of the plurality of dirty cached pages into a single write performed by the first write operation that writes to any of the one or more physical storage devices, said flushing including performing the first write operation. Each of the plurality of dirty cached pages may include a first copy of data for a logical address of the first device that is more recent that a second copy of data for the logical address of the first device stored on any of the one or more physical storage devices. The one or more physical storage devices may be rotating disk drives.

In accordance with another aspect of the invention is a system comprising a processor, a primary cache, a secondary cache, and a memory. The memory may comprise code stored thereon that, when executed, performs a method for cache management including: determining whether to flush dirty cached data included in the secondary cache; and responsive to determining to flush dirty cache data from the secondary cache, performing first processing including: flushing a plurality of dirty cached pages from the secondary cache to one or more physical storage devices, wherein said plurality of dirty cached pages include data from a plurality of logical addresses of a first device, wherein the plurality of logical addresses are sorted in any of an increasing and decreasing order and included in a sorted list, and wherein said flushing include writing the plurality of dirty cached pages in an ordering in accordance with the sorted list. A plurality of storage layers may include the primary cache, the secondary cache and the one or more physical storage devices. The primary cache may have a highest relative performance ranking of the plurality of storage layers, the secondary cache may have a relative performance ranking below the primary cache, and the one or more physical storage devices may have a relative performance ranking less than the secondary cache.

In accordance with another aspect of the invention is a computer readable medium comprising code stored thereon that, when executed, performs a method cache management comprising: determining whether to flush dirty cached data included in a flash disk cache, wherein a plurality of caching layers includes the flash disk cache as a secondary cache and another cache as a primary cache; and responsive to determining to flush dirty cache data from the flash disk cache, performing first processing including: flushing a plurality of dirty cached pages from the flash disk cache to one or more physical storage devices, wherein said plurality of dirty cached pages include data from a plurality of logical addresses of a first device, wherein the plurality of logical address are sorted in any of an increasing and decreasing order and included in a sorted list, and wherein said flushing include writing the plurality of dirty cached pages in an ordering in accordance with the sorted list.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
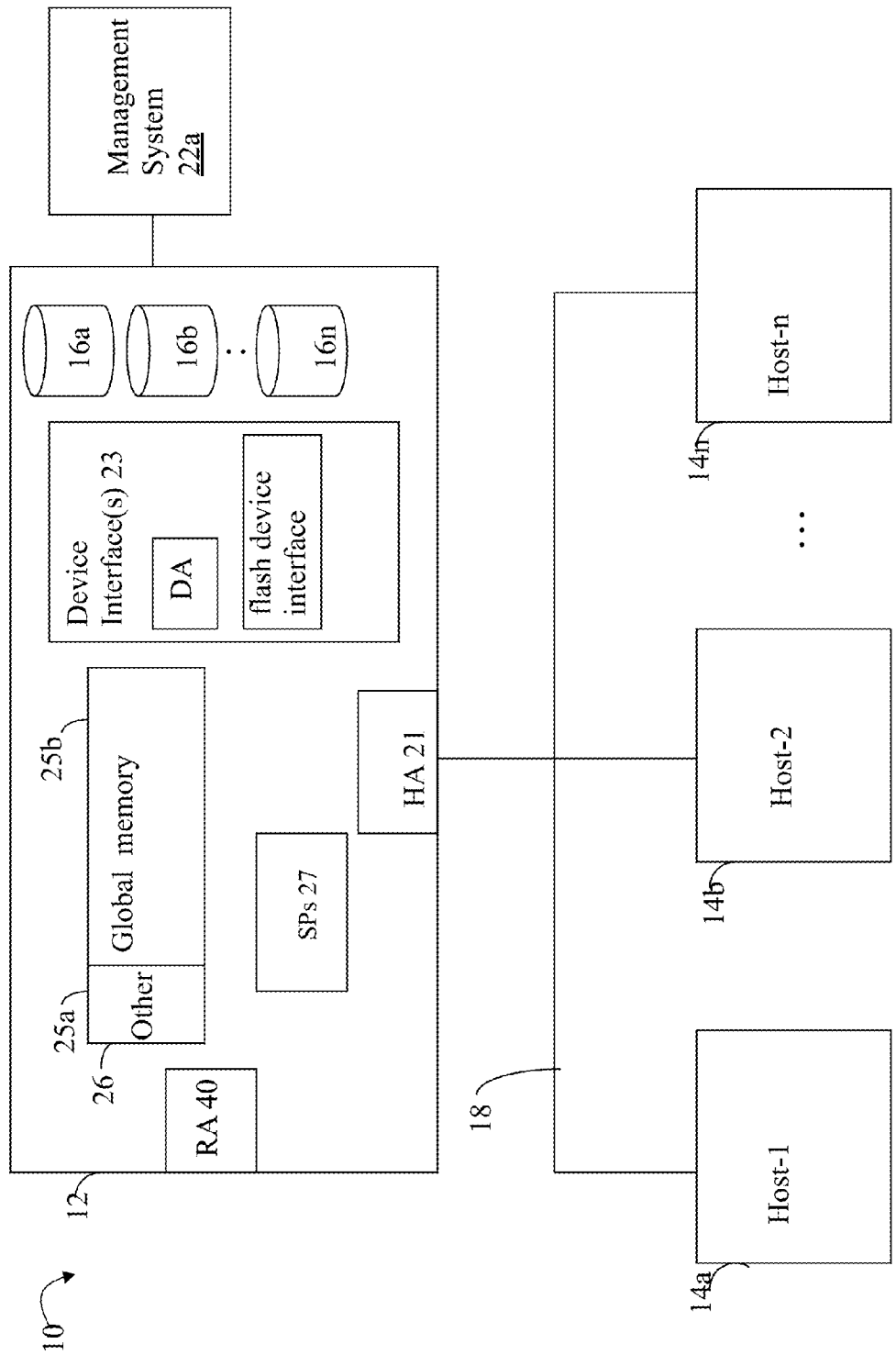
FIG. 1 is an example of components that may be included in a system in accordance with techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the computer system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as block-based protocols (e.g., SCSI, Fibre Channel, iSCSI), file system-based protocols (e.g., NFS), and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN(s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

The device interface, such as a DA, performs I/O operations on a physical device or drive 16a-16n. In the following description, data residing on a LUN may be accessed by the device interface following a data request in connection with I/O operations that other directors originate. The DA which services the particular physical device may perform processing to either read data from, or write data to, the corresponding physical device location for an I/O operation.

Also shown in FIG. 1 is a management system 22a that may be used to manage and monitor the system 12. In one embodiment, the management system 22a may be a computer system which includes data storage system management software such as may execute in a web browser. A data storage system manager may, for example, view information about a current data storage configuration such as LUNs, storage pools, and the like, on a user interface (UI) in display device of the management system 22a.

It should be noted that each of the different adapters, such as HA 21, DA or disk interface, RA, and the like, may be implemented as a hardware component including, for example, one or more processors, one or more forms of memory, and the like. Code may be stored in one or more of the memories of the component for performing processing.

The device interface, such as a DA, performs I/O operations on a physical device or drive 16a-16n. In the following description, data residing on a LUN may be accessed by the device interface following a data request in connection with I/O operations that other directors originate. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical storage device (PD) and location on the PD. The DA which services the particular PD may further perform processing to either read data from, or write data to, the corresponding physical device location for the I/O operation.

As known in the art, a LUN may have physical storage provisioned on one or more PDs of the data storage system where the LUN has a logical address space or range. Logical addresses of the LUN may be mapped to physical storage locations on the PDs. The logical address range for the LUN may, for example, range from a starting logical address of 0 to a maximum logical address that varies depending on the capacity of the particular LUN. In one embodiment, each logical address may denote a logical block address or offset from the starting LBA of 0. Each single block, such as LBA 0, may denote a block or generally some amount of storage that may vary with data storage system (e.g., block size may vary with data storage system).

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of FIG. 1 may be a data storage system, such as the VNXe® data storage system by EMC Corporation of Hopkinton, Mass., that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, memory 26 may represent memory of each such storage processor.

In connection with a data storage system such as described herein, an I/O request may be a read request to read data. The read request may be received at the data storage system at a port of a front-end component of the data storage system (such as one of the HAs as described elsewhere herein). In terms of processing a read request, a determination may be made as to whether all the requested read data is in cache (e.g., a cache hit). If so, the read request may be characterized as a read hit. In such cases of a read hit, the front-end component, such as the HA, receiving the read request may service the read request by retrieving all requested read data from the cache and returning the requested read data to the host. If all the requested read data is not in cache, the read may be characterized as a read miss (e.g., cache miss) whereby processing is performed to retrieve from physical storage any portion of the requested data that is not currently in cache. As described above, one or more DAs may perform processing to retrieve from physical storage any portion of the requested data not currently in cache. Once all the requested read data is in cache, the front-end component, such as the HA, receiving the read request may service the read request by retrieving all requested read data from the cache and returning the requested read data to the host. In this manner, a front-end component may service read requests using data that is already stored in cache prior to processing the read request, as well as using data that is brought into cache from physical storage responsive to receiving the read request.

Storing such data in cache is performed with the goal of servicing subsequent I/Os using cached data without having to retrieve the data from physical storage. In an embodiment in accordance with techniques herein, processing may be performed as just described to unconditionally cache reads as a result of a cache miss and to execute a dependent sequence of steps whereby the DA writes read miss data (retrieved from physical storage) to cache and the HA then retrieves the requested data from the cache to return to the requesting host.

In connection with write operations, write data received at the data storage system may be stored in cache and then written out later to physical storage, such as written to backend physical storage devices by a DA. Once the write data is written into cache, the data may be marked as write pending (WP) in cache denoting that the cached write data is the most recent copy of the data and needs to be destaged to backend physical storage devices. The cache location including the WP data may marked as dirty thereby indicating that the cache location includes valid data and contains the most recent copy of the data but has not yet been synchronized with the copy on physical storage of the back end. Once the write data is written to cache, the data storage system may send an acknowledgement to the host that the write operation has been completed even though the write data may not have yet been destaged from cache to the backend physical storage devices. Once the WP data has been destaged from cache to physical storage, the cache location including the write data may be characterized as clean where the cache location is valid and contains a copy of write data that has been synchronized with backend physical storage.

Figure 2:
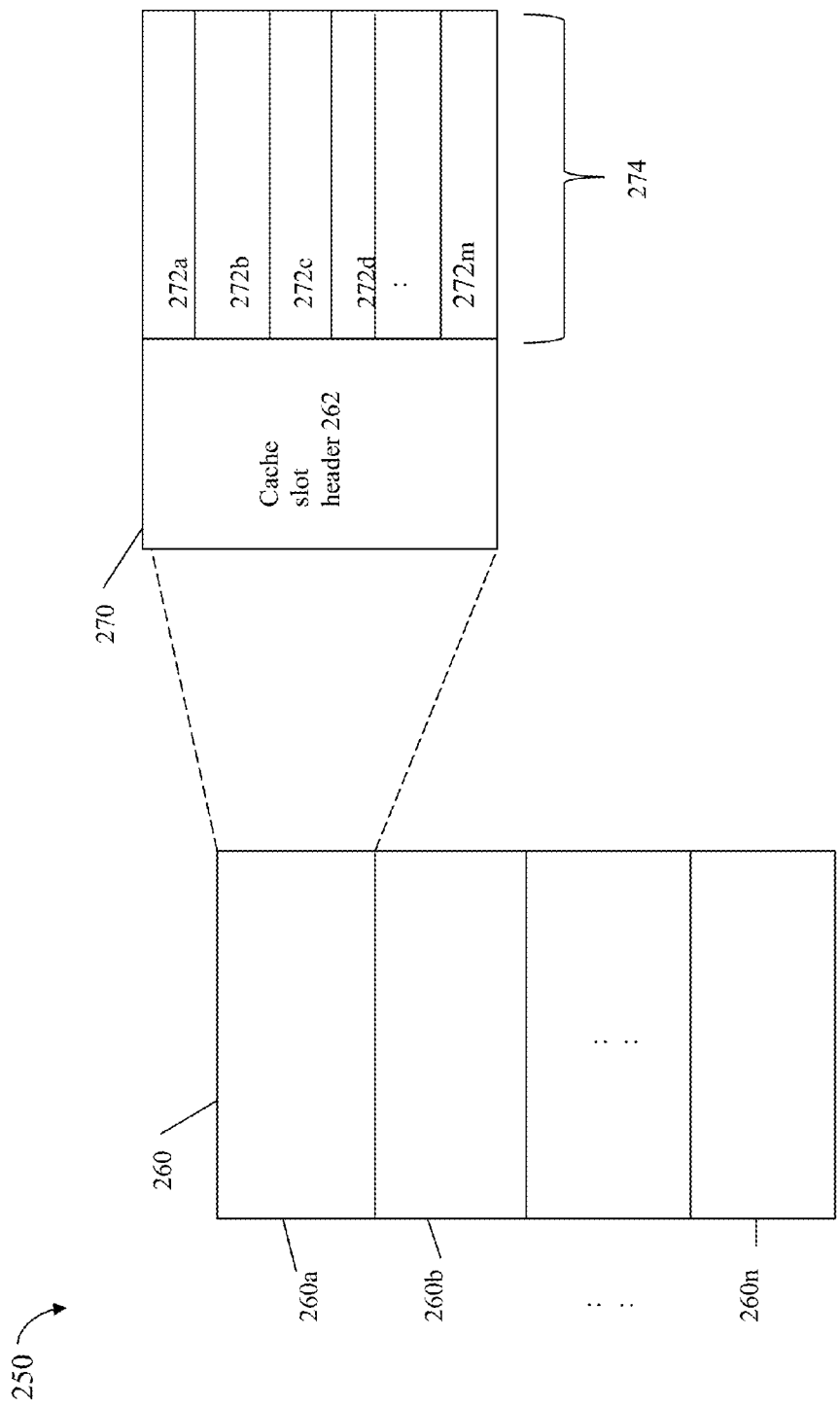
FIG. 2 is an example illustrating in more detail a representation of information that may be included in a primary data cache in an embodiment in accordance with techniques herein.

Referring to FIG. 2, shown is an example illustrating a logical representation of a cache that may be used in an embodiment in accordance with techniques herein. The cache in FIG. 2 may denote generally a data cache that may be used as part of a plurality of cache layers in an embodiment of a data storage system described in more detail below. The cache such as illustrated in FIG. 2 may be, for example, a DRAM cache that is primary or first caching layer in the plurality of caching layers described in more detail elsewhere herein.

In the example 250, element 260 may represent the memory or storage used as the cache which is partitioned into cache slots 260a-260n. It should be noted that the example 250 is a logical representation of a cache that may be implemented using any suitable data structure(s) known in the art. Each of the cache slots 260a-n may contain varying amounts of write pending data. Consistent with description elsewhere herein, write pending data may be user data received in connection with a write operation where the user data has been stored in cache and is waiting to be destaged or written out to physical storage (e.g., element 212 of FIG. 5A) from cache. Element 270 provides additional detail of single cache slot 260a Cache slot 260a may include a cache slot header 262 and cache slot data 274. The cache slot data 274 illustrates that a single cache slot of data may further include multiple portions 272a-m each of which may or may not include write pending data and each of which may or may not include any cached data. The cache slot header 262 may include additional information regarding the cached data stored in 274. For example, the header 272 may denote whether the data cached in each of the portions 272a-m is write pending data.

It should be noted that the particular granularity or smallest unit of storage for storing cached data may vary with embodiment. For example, each of the portions 272a-m may denote a smallest unit of storage for storing cached data. Additionally, the particular number of portions in a cache slot may also vary with embodiment.

Although not illustrated in FIG. 2 for simplicity and as known by those of ordinary skill in the art, an embodiment may store additional information for each of the cache slots regarding the data stored in area 274 of each such cache slot. For example, for a particular LUN and offset, such additional information may map the particular LUN and offset to a cache location containing the data for that LUN and offset. Such additional information may also, for example, map a particular PD and PD offset to a cache location containing the data for that PD and offset. Generally, such additional information may be stored in any suitable location and used, for example, by the HA, DA and other data storage system components and executing code, as an index to map into the cache 260 to retrieve and/or store data from the cache. For example, the HA may manage and/or use information mapping a LUN and LUN offset to a cache location including data stored at the LUN offset on the particular LUN. The DA may manage and/or use information mapping a PD and offset on the PD to a cache location including data stored at the offset on the particular PD. In one embodiment, for example, the foregoing mapping of a LUN location so its physical device location may be included in the location information of MD associated with user data described in more detail elsewhere herein.

Figure 3:
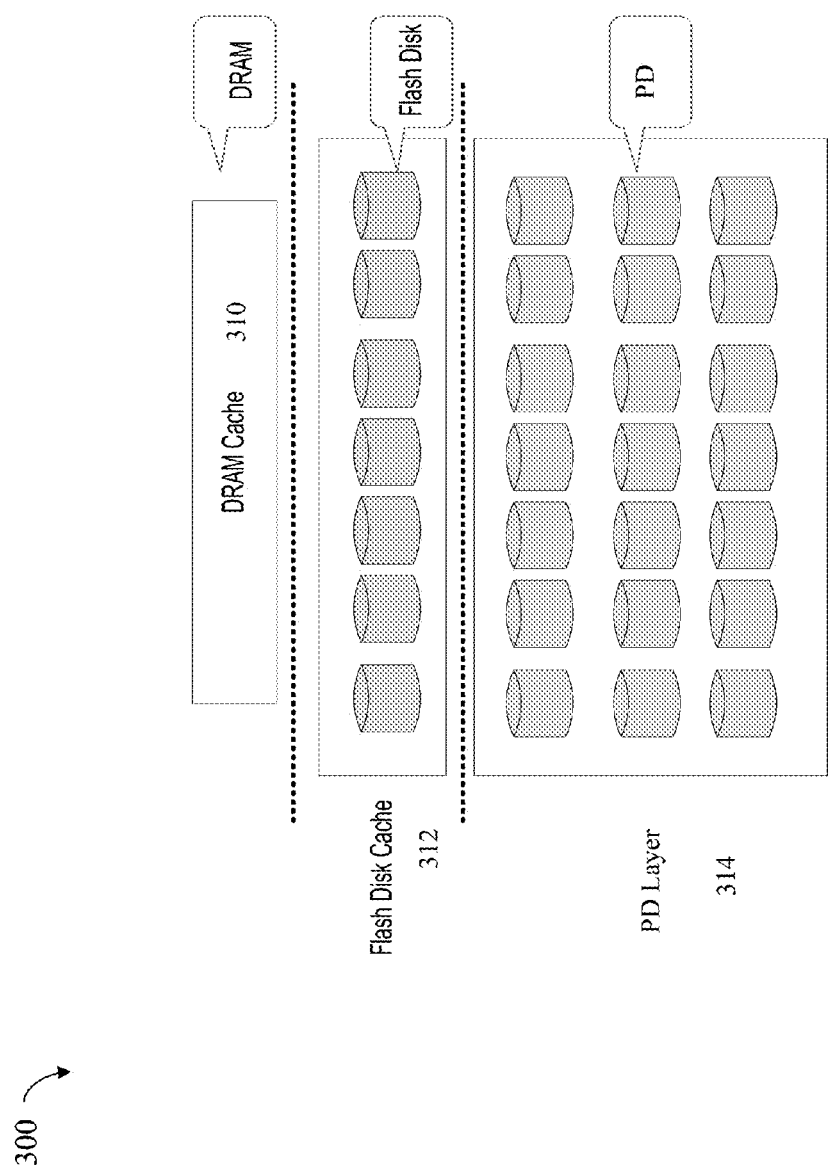
FIG. 3 is an example illustrating a plurality of layers that may be included in an I/O path in an embodiment in accordance with techniques herein.

Referring to FIG. 3, shown is an example illustrating a plurality of layers including caches and physical backend storage in an embodiment in accordance with techniques herein. The example 300 includes DRAM cache 310, flash disk cache 312, and a backend physical storage device (PD) layer 314. The flash disk cache 312 may include flash-based storage devices or other solid state storage. The PD layer 314 may include, for example, rotating disk drives that provide non-volatile storage for data and may be organized into groups such as RAID groups providing the backend PDs which may be accessed, for example, by DAs when reading data from the PDs (such as to read data from the PD and then store such read data in the DRAM cache 310 cache to service a read miss) and/or when writing data to the PDs (such as to destage data from DRAM cache 310).

In at least one embodiment of a data storage system in the illustrated hierarchy of FIG. 3, the Flash Disk Cache 312 is under the DRAM or general data cache 310, and below the Flash Disk Cache 312 are backend PDs 314. Generally, the DRAM cache 310, also referred to herein as the cache or data cache, may be the primary or highest caching layer such as mentioned above where read and write data are placed on first instance in connection with an I/O operation. Thus, in one aspect, the DRAM cache 310 may denote a level 1 (L1) primary cache and the Flash disk cache 312 may denote a level 2 (L2) secondary cache. Element 310 may denote, for example, the cache to which data is first written when write operations are received by the host such as described above. Generally, the layers of FIG. 3 may be ranked, in terms of relative performance, from highest to lowest, as follows: DRAM cache 310, the flash disk cache 312, and PDs 314. The Flash disk cache 312 may include flash-based storage devices. More generally, the flash disk cache 312 may include a form of solid state or other storage that may be non-volatile which fits in with the above-mentioned relative performance ranking.

Flash disk cache 312 may be characterized as a storage-system component that improves performance by transparently storing or promoting data from PDs 314 into Flash Disk media (Flash disk) of layer 312, so that user requests for data can be served much faster than if retrieved from PDs 314. PDs of layer 314 may be used to store all the user data and serve the I/O requests which cannot be serviced by using data from either DRAM cache 310 or Flash disk cache 312. Generally, as mentioned above, PDs of layer 314 provide the slowest response time of all layers 310, 312 and 314 when there is a need to access the PD to read data therefrom and/or write data thereto.

Data may be promoted from PDs 314 to the Fast cache 312 based on "temperature" related to I/O activity or frequency of access (e.g. number of reads and/or writes for the data). Placing or promoting data chunks from PDs 314 is not dependent on whether the data is already in DRAM cache 310. In at least one embodiment, the PDs 314 may denote rotating disk drives or more generally PDs having a lower performance than the flash-based drives of layer 312. In at least one embodiment, data may be stored in the Flash disk cache in chunks, such as chunks that are each 64 KB in size. It should be noted that in some systems, the backend physical storage devices may also include flash-based storage devices having an expected level of performance similar to those physical storage devices of the Flash disk cache 312. In such cases, an embodiment may decide not to use the Flash disk cache 312 with user data stored on back-end physical storage devices which are flash-based since there is similar performance when accessing data from either the back-end physical storage devices or Flash disk cache 312. Rather, an embodiment may selectively choose to enable or use the Flash disk cache 312 in connection with user data that will more generally see a performance benefit in obtaining data from the Flash disk cache rather than back-end storage devices. Thus, generally, the PDs of 314 may include rotational disk drives, or more generally, PDs having an excepted level of performance that is less than the expected level of performance when accessing data from drives or physical storage comprising the Flash disk cache 312.

In a manner similar to that as described in connection with FIG. 2, a memory map or mapping information may be maintained by the Flash disk cache layer 312 to indicate whether a particular data portion located at a particular LUN and offset (e.g., LBA) is currently stored in the Flash disk cache and if so, the particular location in the Flash disk cache where such data is located. In addition to the mapping information, the Flash disk cache 312 may also store information indicating whether the data stored in a cache page of the Flash disk cache 312 is dirty thereby denoting that the cache location includes valid data and contains the most recent copy of the data but has not yet been synchronized with the copy on of the PD layer 314. Generally, in addition to mapping information, the Flash disk cache layer 312 may use a structure referred to herein as the shadow cache to store other metadata that may be used by the Flash disk cache 312. For example, the shadow cache may store information regarding the access frequency of different data portions located at various LUN locations where such LUNs have storage provisioned from PDs of the PD layer 314. Thus, the frequency of access information in the shadow cache may be used to determine when to promote data from the PD layer 314 to the Flash disk cache 312.

It should also be noted that the Flash disk cache layer 312 may also experience cache or read hits and also cache or read misses with respect to whether requested read data is stored in the Flash disk cache 312. Thus, the Flash disk cache 312 may have associated states and experience cache hits and misses in a manner similar to the DRAM cache 310 used as the primary or level 1 cache in the hierarchy of FIG. 3.

Generally, the first time data is accessed for read or write, the data is stored in the DRAM cache 310 as the primary data cache in connection with I/O processing of the data path. Processing may be performed to monitor how frequently a particular data portion is accessed (such as within a specified period of time) to determine whether such observed access frequency reaches a threshold level to warrant storing such data also in the Flash disk cache layer 312. The shadow cache described above may be used by the Flash disk to track such access frequency for data at different LUN locations and determine when to promote a data portion stored at a particular LUN location from PDs 314 to the Flash disk cache 312.

In at least one embodiment the DRAM Cache 310 may cache the hottest (e.g., most frequently accessed) data and Flash Disk Cache 312 may cache data that is relatively less frequently accessed than data of the DRAM cache 310.

In connection with processing an I/O operation such as a read operation, processing may first determine whether the requested read data is in the primary data cache, such as the DRAM cache 310. If so, the requested data is read from cache and returned to the requester. If the requested read data is not in the primary data cache (e.g., DRAM cache 310), processing may determine whether the requested data is stored in the Flash disk cache. If so, the requested data is obtained from the Flash disk cache 312 and returned to the requester. If the requested data is not in the Flash disk cache 312, the requested data is obtained from PDs 314, may be stored in the DRAM cache 310 and then returned to the requester. Additionally, depending on frequency of access as described elsewhere herein, the data may also be stored in the Flash disk cache.

In connection with write operations, the write data is written to the primary data cache, such as the DRAM cache 310, and an acknowledgement is returned to the requester that the write operation has complete. At some later point in time, processing may be performed to destage the write data from the DRAM cache 310. As mentioned elsewhere herein, data, such as the write data being destaged, may be promoted to the Flash disk cache if there has been sufficient frequency of access to such write data. Thus, as part of destaging the write data from the DRAM cache 310, processing may include determining whether the write data has been promoted to the Flash disk cache. If so, the write data is stored in the Flash disk cache and then later may be flushed from the Flash disk cache to the PDs 314. If the write data is not promoted to the Flash disk cache, the data is written out from the DRAM cache directly to the PDs 314.

In some embodiments, it may be that write caching to the primary data cache, such as DRAM cache 310, is disabled whereby caching may be performed with respect to only the Flash disk cache layer 312. In such a case, the write data received is not stored in the DRAM cache 310 when received and rather the write operation data processing proceeds directly to the Fast cache layer where a determination is made as to whether to store the data in the Flash disk cache. As noted elsewhere herein, such a determination may be made based on whether there has been a sufficient level of access frequency (e.g., above a specified threshold level of activity) to the write data to warrant storing or promoting the write data to the Flash disk cache. If it is determined that the write data has not been promoted to the Flash disk cache, the write data is written directly to the PDs 314. Otherwise, if it determined that the write data has been promoted to the Flash disk cache, the write data is written to the Flash disk cache and then some time later may be flushed to the PDs 314.

In an embodiment in accordance with techniques herein, the I/O path denoting the processing path taken in connection with processing a user or host I/O operation may pass through the layers such as illustrated in FIG. 3. Processing may be performed at the various layers as described herein to determine what steps are performed in connection with processing the I/O operation.

Described in following paragraphs are techniques that may be used to manage dirty pages in Flash Disk Cache to improve Flash Disk Cache background service performance and reduce the number of I/Os between the Flash Disk Cache 312 and PD layer 314.

Figure 4:
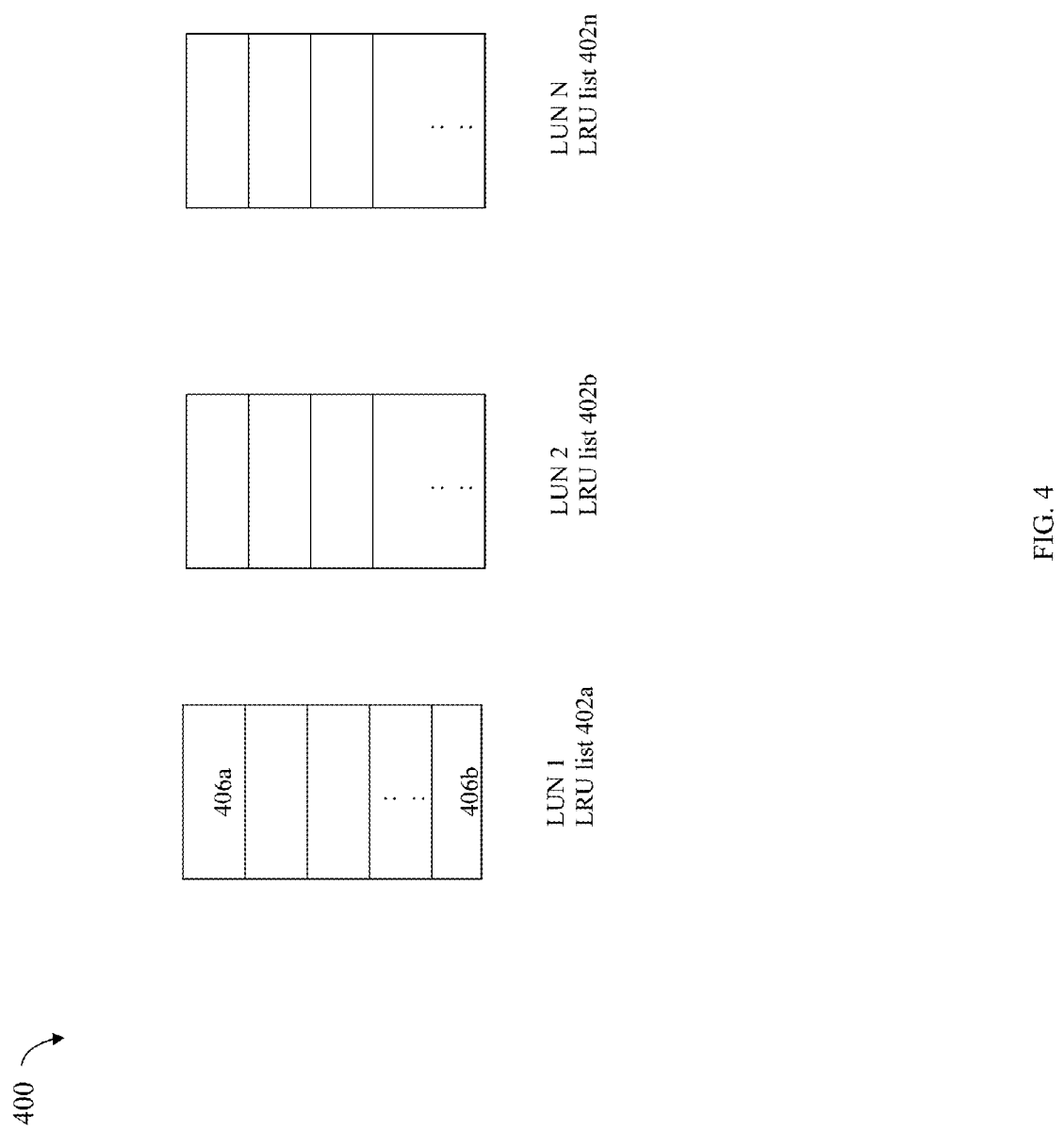
FIGS. 4, 5, 6, 7 are examples of structures that may be used in an embodiment in accordance with techniques herein.

With reference to FIG. 4, in at least one embodiment, the Flash disk cache may partition its cached pages of data on a per-LUN basis whereby each LUN's cached pages may be grouped together logically in connection with a data structure such as illustrated in the example 400 of FIG. 4. For example, FIG. 4 includes lists 402a-n denoting logical groupings of cache pages where each such logical grouping 402a-n includes cache pages containing data for a particular LUN. Element 402a denotes a list of cached pages containing data in the Flash disk cache for LUN1. Element 402b denotes a list of cached pages containing data in the Flash disk cache for LUN2. Element 402n denotes a list of cached pages containing data in the Flash disk cache for LUN N.

Each of 402a-n may denote a structure linking together the cached pages of the Flash disk cache for a single LUN. Thus, for example, each entry such as 406a of 402a may denote a different cache page of the Flash disk cache 312 including cached data for LUN 1. In a similar manner, entries of each of LUN lists 402b-n also denote a different cache page of the Flash disk cache 312 including cached data for a particular LUN. Each of 402a-n may be any suitable data structure. For example, in one embodiment, each of 402a-n may be a doubly linked list data structure as known in the art. Additionally, each entry of a list, such as entry 406a, may denote a single cache page and may also include metadata regarding the cache page such as state information denoting whether the cached data is dirty, the particular LBA or offset location(s) on the LUN corresponding to the data stored in the cache page, and the like, as described elsewhere herein. Entries in each of the LUN lists 402a-n may also ordered based on access frequency or temperature associated with the data cached in each cache page or list entry. For example, in one embodiment, entries of each list 402a-n may be ordered, from most recently used or accessed to least recently used (LRU) or accessed. For example with reference to 402a, entries in 402a may be ordered based on time since last accessed with the most recently used data at the top of the list and the least recently used data at the bottom of the list. To further illustrate, entry 406a may be the most recently used cached data for LUN 1 and entry 406b may be the least recently used cached data for LUN 1.

At various points in time, data may be flushed or moved from the Fast disk cache to the back-end PDs 314. For example, one or more cache pages of data (for which Flash data cache promotion is currently scheduled or can be performed since the cached data as sufficient access frequency) may be flushed from the Fast disk cache. Such flushing may occur, for example, when there are no free or clean pages available in the Flash disk cache. In such instances when there are no free or clean pages, processing may be performed that includes selecting one or more cache pages including data to be flushed from the Flash disk cache 312 to the PDs 314.

As noted elsewhere herein, data stored in the Flash disk cache may be dirty or WP in that the cached data is the most recent or up to date copy of the user data and is more up to date than the copy stored on the PDs (e.g., the data stored in the Flash disk cache has not yet been synchronized with the copy stored on the PDs 314). In such an instance, flushing may include flushing dirty cache pages including such dirty data to the PDs 314. Once the dirty data has been written from the Flash disk cache to the PDs (whereby the PDs 314 now include the same most recent copy of the data as stored in the Flash disk cache), the cache disk page and associated data may be updated in status from dirty to clean.

Figure 5:
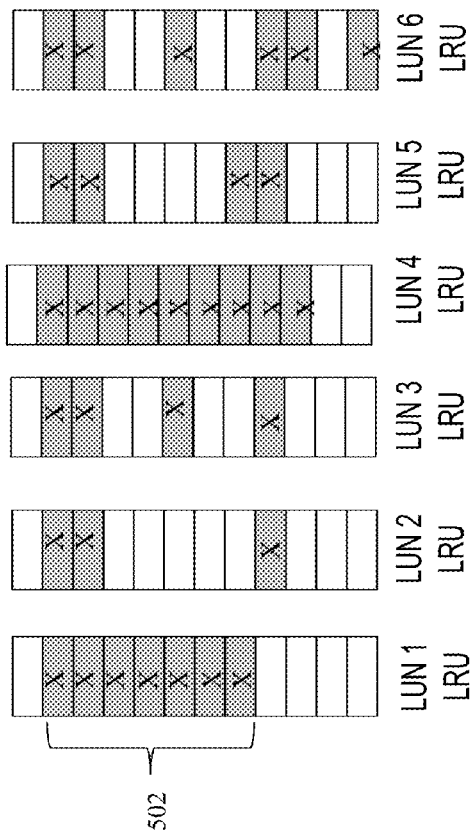

Referring to FIG. 5, shown is an example 500 illustrating 6 LUN LRU lists for 6 LUNs that may be used in connection with Flash disk cache management in an embodiment in accordance with techniques herein. The example 500 includes 6 LUN LRU lists each of which may be a list of cached page entries from the Flash disk cache containing data for a single LUN such as described above in connection with FIG. 4. FIG. 5 may show the state of the Flash disk cache and its associated 6 LUN LRU lists for LUNs 1-6 after the data storage system has been running for a period of time and servicing read and write I/Os directed to the LUNs 1-6. In the example 500, those blocks including an X or which are shaded denote dirty cache pages of the Flash disk cache including dirty data of the associated LUNs. For example, element 502 denotes the set of dirty cache pages including dirty data for locations on LUN 1.

In addition to the LUN LRU lists such as illustrated in FIGS. 4 and 5, an embodiment in accordance with techniques herein may maintain and use lists of dirty pages per LUN (LUN dirty page list). Each LUN dirty page list may denote a list of cached dirty pages for a single LUN where the list is sorted in LBA order. This further illustrated now with reference to FIG. 6.

In one embodiment as described herein, each cache page of the Flash disk cache may contain a single block of data (e.g., for a single one of the LBAs of a LUN).

Figure 6:
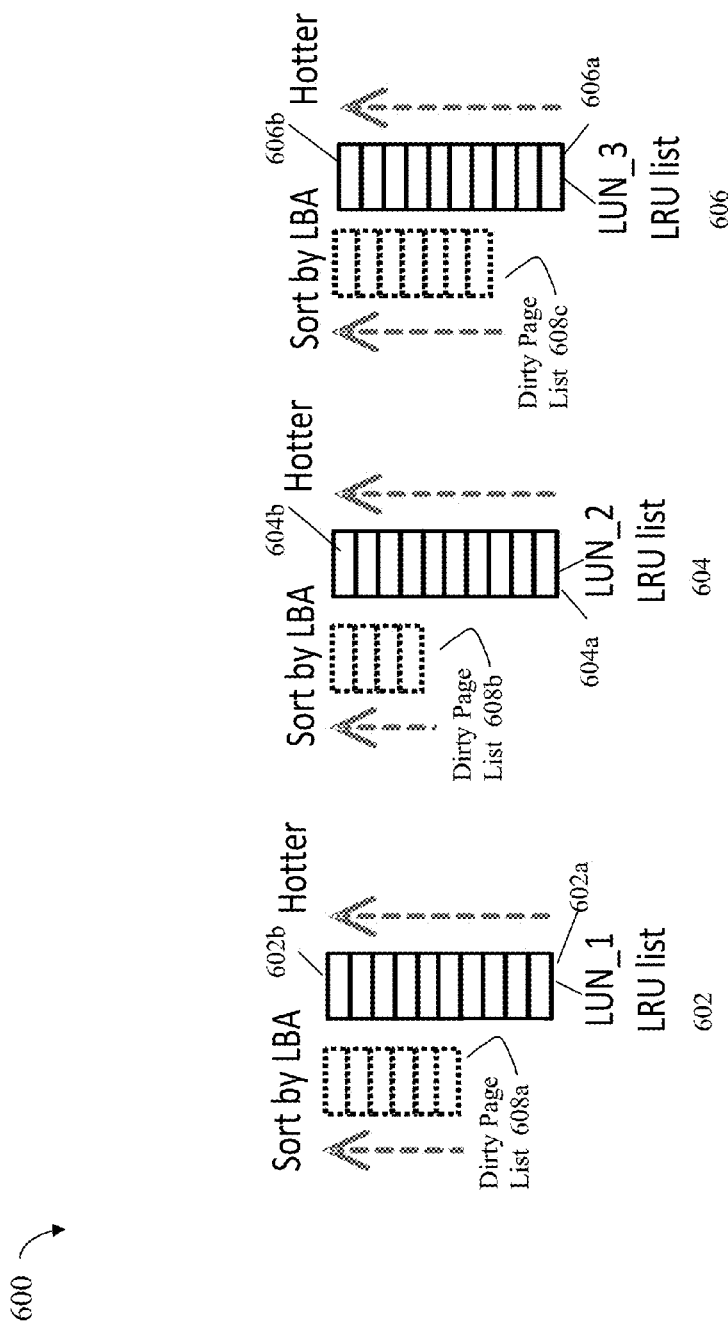

Referring to FIG. 6, shown is an example of information for 3 LUNs that may be used in connection with Fast disk cache management in an embodiment in accordance with techniques herein. The example 600 includes 3 LUN LRU lists 602, 604 and 606 which are similar to such lists as described in connection with FIGS. 4 and 5 (e.g., such as elements 402a-c of FIG. 4 and the 6 lists of FIG. 5).

LRU lists 602, 604 and 606 may each be sorted based on time since last accessed as described elsewhere herein. In list 602, entry 602a may denote the coldest or cached data for LUN 1 which has not been accessed for the longest period of time (least recently used) of all entries in 602 and entry 602b may denote the hottest or cached data for LUN 1 which was most recently access of all entries in 602. In list 604, entry 604a may denote the coldest or cached data for LUN 2 which has not been accessed for the longest period of time of all entries in 604 and entry 604b may denote the hottest or cached data for LUN 2 which was most recently access of all entries in 604. In list 606, entry 606a may denote the coldest or cached data for LUN 3 which has not been accessed for the longest period of time of all entries in 606 and entry 606b may denote the hottest or cached data for LUN 3 which was most recently access of all entries in 606.

Additionally, shown in the example 600 are dirty pages lists 608a-c each of which denotes a list of cached dirty pages for a single LUN and the list is sorted in LBA order. In one embodiment, lists 608a-c may each be a doubly linked list linking together dirty cache pages of a single LUN. For example, element 608a may be the dirty page list for LUN 1 having a corresponding LRU list 602 where each entry in 608a is a dirty cache page also included 602. Element 608b may be the dirty page list for LUN 2 having a corresponding LRU list 604 where each entry in 608b is a dirty cache page also included 604. Element 608c may be the dirty page list for LUN 3 having a corresponding LRU list 606. where each entry in 608c is a dirty cache page also included 606.

An embodiment in accordance with techniques herein may use the dirty page lists 608a-c in connection with determining a sequential ordering in which dirty data is flushed from the Flash disk cache to the PDs 314. In such an embodiment in accordance with techniques herein, flushing, or more generally, performing write and/or read I/Os when in a sequential order based on sequential ordering of LUN LBAs results in improved performance when accessing the PDs which are rotating disk drives. Performing sequential I/Os to PDs which are rotating disk drives results in improved I/O performance as opposed to performance resulting when the I/Os to the PDs are random. As known in the art, with rotating disk drives, there is an amount of time needed to reach a particular track on the rotating disk drive. Thus, to have random I/Os when writing to rotating disk drives typically causes the drive head to move between particular tracks as needed for locating the different locations on the drive to where data is read from or written to. Increased performance may result by issuing I/O based on sequential LBA since such data for sequential LBAs may be stored sequentially on the underlying PDs.

Figure 6B:
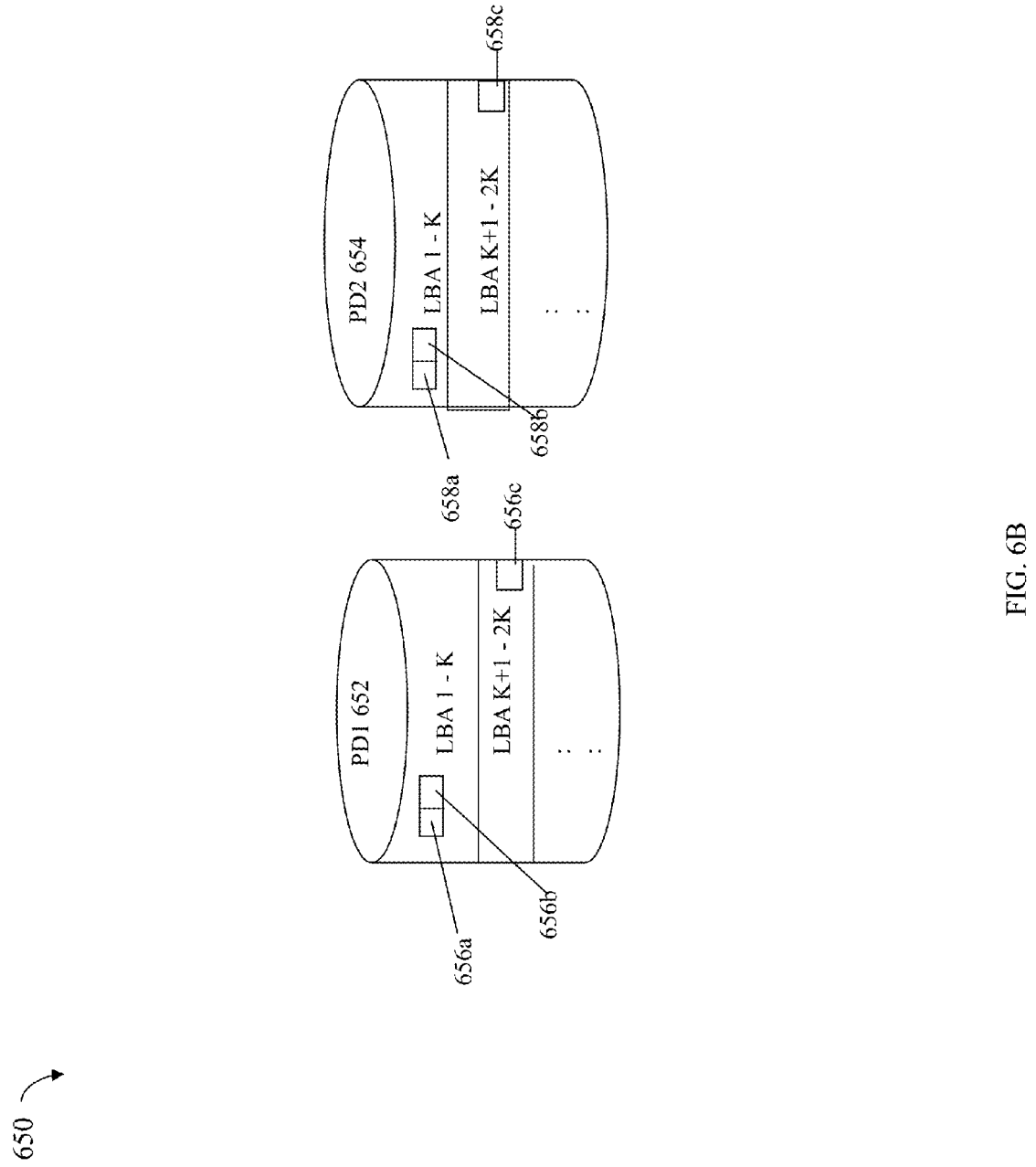
FIG. 6B is an example illustrating a RAID configuration that may be used in an embodiment in accordance with techniques herein.

Referring to FIG. 6B, shown is an example illustrating two PDs that may be configured into a RAID-1 RAID group in an embodiment in accordance with techniques herein. As known in the art, RAID-1 provides data protection by mirroring data. In the example 650, the RAID-1 group may include two PDs 652 and 654 where data written to PD1 652 is mirrored on PD2 654. Assume that a LUN, such as LUN 1, is configured to have its physical storage provisioned from this RAID-1 group. LUN 1's logical address spaces may be partitioned into portions that are K LBAs in size (K being generally a non-integer value) each mapping to a stripe of data stored on the RAID-1 group. Assume that 656a indicates a first physical location (e.g., track and sector) on PD1 652 at which data for LUN 1, LBA 4 is stored and that 656b indicates a second physical location (e.g., track and sector) on PD1 652 at which data for LUN 1, LBA 5 is stored. In such a case in this example, the foregoing first and second physical locations are located in the same stripe and may be located physically next to one another on PD 1 652. Similarly, PD2 654 mirrors LUN 1's data where 658a indicates a first physical location (e.g., track and sector) on PD2 654 at which data for LUN 1, LBA 4 is stored and that 658b indicates a second physical location (e.g., track and sector) on PD2 654 at which data for LUN 1, LBA 5 is stored. In such a case in this example, the foregoing first and second physical locations are located in the same stripe and may be located physically next to or near one another on PD 2 654 (e.g. may be located in the same track). Thus, there is a performance benefit to issuing write I/Os sequentially (based on sequentially ordered LBAs) where a first write writes to LBA 4 immediately followed by a second write to LBA 5 in order to minimize overhead (e.g., time such as due to seek time and latency time) incurred to accomplish the foregoing 2 writes. If, alternatively, there was an intervening write between the foregoing 2 writes, such as a write to LUN 1, LBA 2K, additional time would be incurred. Element 656*c* may denote a third physical location on the PD 1 652 including the data for LUN 1, LBA 2K where the third physical location may be located on a different track than either 656*a* or 656*b*. In this case, performing the writes in order to LBA 4, LBA 2K and then LBA 5 incurs additional time in terms of seek time to position between tracks rather than if the writes are performed in order to LBA 4, LBA 5 and then LBA 2K. Note that element 658*c* may denote the mirror copy of data for LUN 1, LBA 2K as stored on PD2 654 (e.g., data at 656*c* and 658*c* mirror data for LUN 1, LBA 2K).

It should be noted that the foregoing example of FIG. 6B is merely illustrative of how the data may be arranged on the underlying PDs. Similarly, the data may be stored on underlying PDs configured into other RAID groups having different RAID levels (e.g., RAID-5, RAID-6, etc.). However, the example 650 illustrates a benefit of performing I/O operations to rotating disk drives based on a sequential ordering of LBA of the LUN where the data is physically arranged on the PDs so that consecutive LBAs, such as included in the same stripe, may have their data stored at physical locations near one another.

Figure 7:
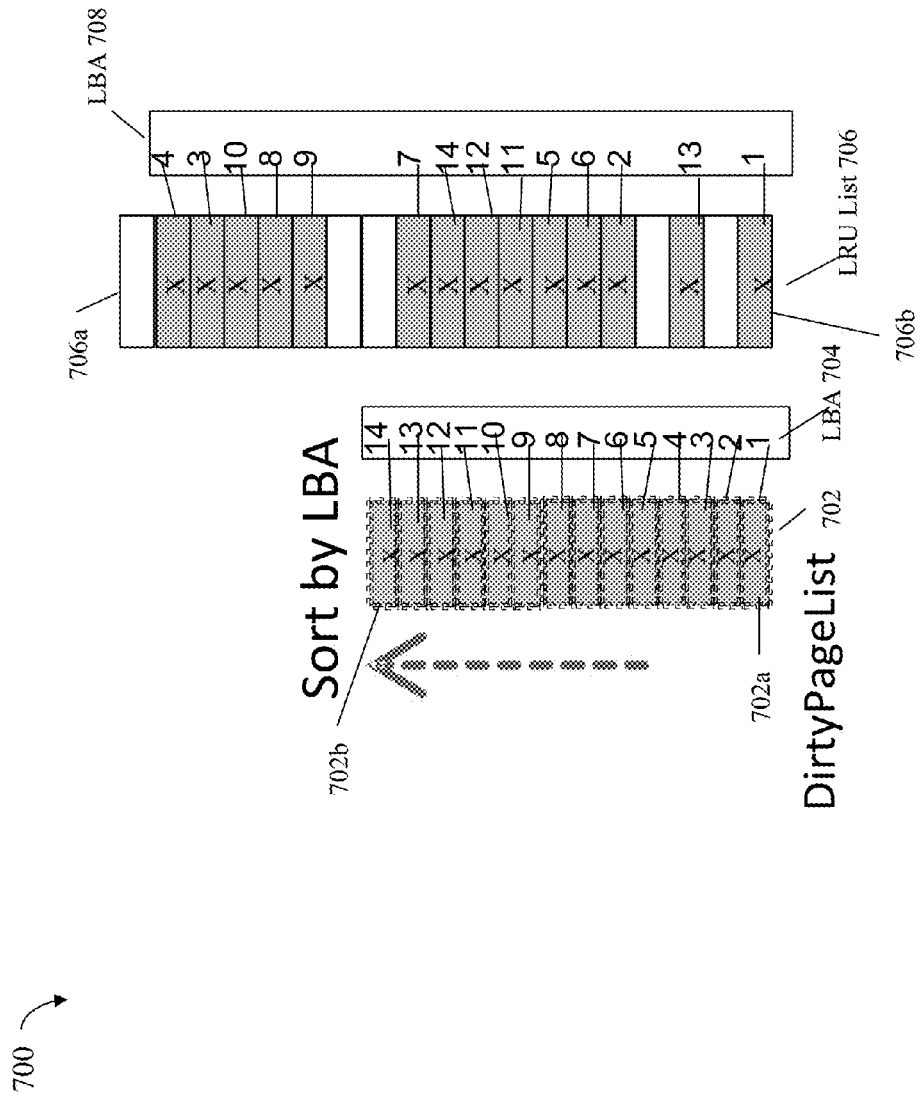

Referring now to FIG. 7, shown is an example providing additional detail regarding an LRU list and an associated dirty page list for a single LUN as may be used in an embodiment in accordance with techniques herein in connection with management of the Flash disk cache. It should be noted that the example 700 illustrates additional detail regarding structures used in connection with Fast disk cache management for only a single LUN, such as LUN 1. However, similar structures having similar detail may be used in connection structures for each LUN having data stored in the Flash disk cache.

The example 700 includes LRU list 706 for a single LUN 1 and its associated dirty page list 702. As described above, the LRU list 706 may be sorted based on time since last accessed where entry 706*a* may denote the cache entry including the most recently accessed data and entry 706*b* may denote the cache entry including the least recently used page.

Dirty pages in the LRU list 706 are denoted by entries including an X and which are greyed out. Thus each entry in list 706 having an X (and is greyed out) is also included in list 702. Element 708 may denote the particular LBAs associated with the dirty cache pages of the LRU list 706 whereby a particular LBA associated with a particular entry in 706 indicates that the entry includes dirty cached data for that LBA. For example, entry 706*b* includes dirty cached data for LBA 1 of LUN 1.

The dirty page list 702 is an LBA sorted list of dirty cached pages for LUN 1 in this example where each page in 702 is also marked as a dirty cache page in the associated LRU list 706 for LUN 1. Entries in 702 are all dirty as denoted by each entry having an X and being greyed out. Element 704 denotes the particular LBAs associated with the dirty pages in the dirty page list 702. For example, the first entry 702*a* includes dirty cached data for LBA 1 of LUN 1 and entry 702*b* includes dirty cached data for LBA 14 of LUN 1. One end of the list 702 includes the first entry 702*a* with the lowest LBA of the cached dirty pages for LUN 1 and the other end of the list 702 includes the last entry 702*b* with the largest LBA of the cached dirty pages for LUN 1 with other entries on the list sorted in increasing LBA order from the lowest LBA to the largest LBA.

When processing (such as may be performed by a background service or process) is performed to flush pages from the Flash disk cache 312 to the PDs 314, such processing uses the dirty page list 702 whereby dirty cache pages may be flushed in a sequential order (based on sequential LBA ordering for the single LUN), such as in the increasing LBA ordering indicated by 704 for the list 702.

The LRU lists maintained for the LUNs may be used in connection with determining what data to evict from the Flash disk cache, for example, should flushing the Flash disk cache not provide any free cache pages or an insufficient number of cache pages needed. In such a case, additional processing may be performed to obtain additional cache pages, such as by evicting clean cache pages of data whereby such cache pages are selected based on those that have been least recently used. For example, for a LUN such as LUN 1, LRU list 706, may be used in connection with determining what data to evict from the Flash disk cache. For example, assuming an eviction policy of evicting the cached data that has been least recently used, cached data may be evicted in order by commencing with traversal from the tail or end of the LRU list 706 (e.g., as denoted by the end 706*b*) including the least recently used cached data.

Figure 8:
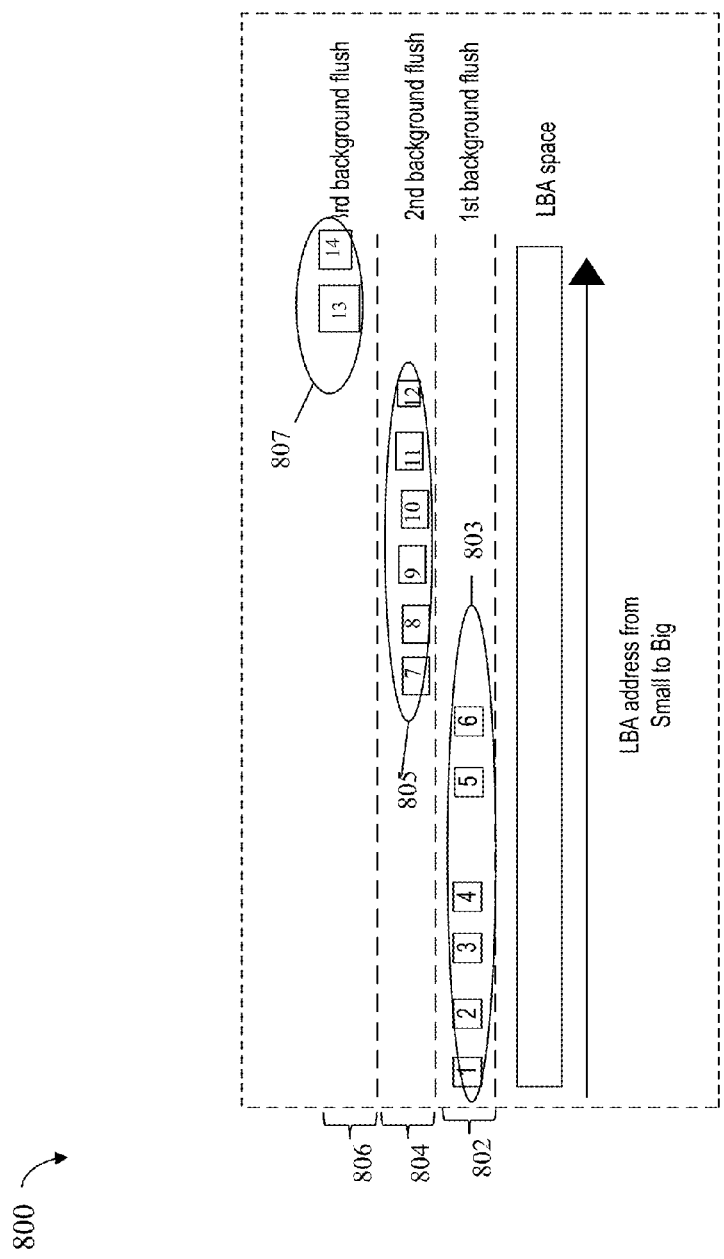
FIGS. 8, 9, 10 and 11 are examples illustrating various I/Os that may be performed in an embodiment in accordance with techniques herein.

Referring to FIG. 8, shown is an example illustrating an LBA sorted order in which cached dirty data may be flushed from the Flash disk cache to PDs in an embodiment in accordance with techniques herein based on LBA order. The example 800 illustrates one way in which cached pages of dirty data for LUN 1 as illustrated in FIG. 7 may be flushed from the Flash disk cache to PDs based on increasing LBA order as indicated in the dirty page list 702 of FIG. 7.

In one embodiment, a background service, task or process may execute to perform the flushing operation. At a first point in time when the background service executes, it may flush dirty data from 6 cache pages for LUN 1 using 6 separate write issued in an ordering from LBA 1-6, as denoted by elements 802 and 803. At a second subsequent point in time when the background service executes, it may flush dirty data from another 6 cache pages for LUN 1 using 6 separate writes issued in an ordering from LBA 7-12 as denoted by elements 804 and 805. At yet a third point in time subsequent to the second point in time when the background service executes, it may flush dirty data from remaining 2 cache pages for LUN 1 using 2 separate writes issued in an ordering from LBA 13-14 as denoted by elements 806 and 807.

Element 802 denotes a first set of dirty cache pages in the first 6 entries (for LBAs 1-6) of list 702 that may be flushed to the PDs in sequential order from LBA 1-6. It should be noted that element 802 indicates that there may be 6 separate writes, each flushing dirty data of one of the first 6 cached data page/entries of list 702.

Element 804 denotes a second set of dirty cache pages in the next 6 entries (entries 7-12 for LBAs 7-12) of list 702 that may be flushed to the PDs in sequential order from LBA 7-12. It should be noted that element 804 indicates that there may be 6 separate writes, each flushing dirty data of one of the entries 7-12 of list 702.

Element 806 denotes a third set of dirty cache pages in the last 2 entries (entries 13-14 for LBAs 13-14) of list 702 that may be flushed to the PDs in sequential order from LBA 13-14. It should be noted that element 806 indicates that there may be 2 separate writes, each flushing dirty data of one of the last 2 entries of cached data page/entries of list 702.

Furthermore, in some instances, an embodiment in accordance with techniques herein may further combine dirty data from multiple cache pages where such data when combined forms a logically contiguous portion of the LUN's logical address space (e.g., contiguous or consecutive range of LBAs). As will be appreciated by those skilled in the art, an embodiment may perform reads and/or writes with respect to the PDs which read and/or write data in specified sizes or chunks. Thus, the amount of data that may be combined may be limited by the granularity and maximum amount of data that may be written to or read from a PD in a single operation.

Figure 9:
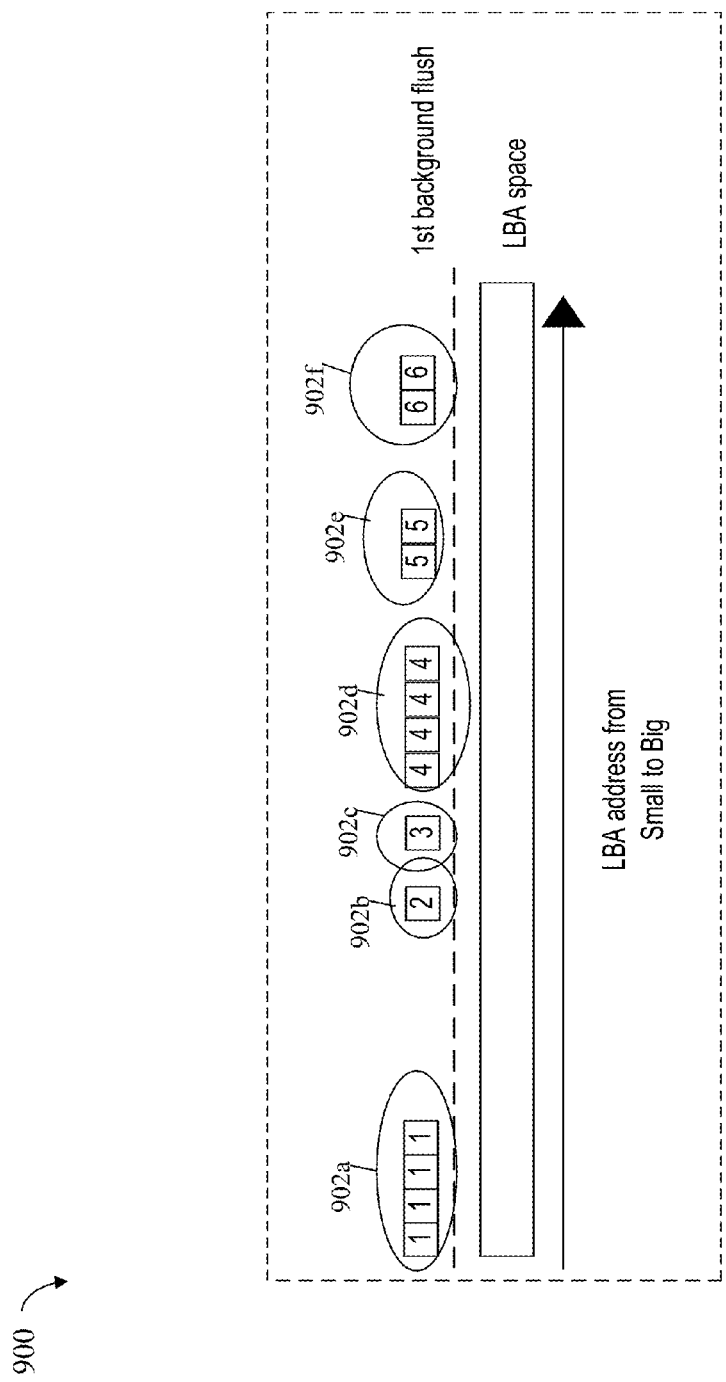

For example, with reference to FIG. 9, shown is an example illustrating one way in which the dirty cached data described in connection with FIGS. 7 and 8 may be combined in connection with flushing dirty cached data from the Flash data cache to the PDs in an embodiment in accordance with techniques herein.

Element 902a indicates that dirty data for LBAs 1-4 (from the entries 1-4 of list 702 of FIG. 7) may be combined into a single write operation that writes dirty data from the Flash disk cache to the PDs storing data for LUN 1. In this example, the dirty cached data of LBAs 1-4 forms a logically contiguous portion of sequential LBAs of the logical address space of LUN 1 and may therefore be written in a single write operation.

Element 902b indicates that dirty data for LBA 5 (from the entry 5 of list 702 of FIG. 7) may be included in a single write operation that writes dirty data from the Flash disk cache to the PDs storing data for LUN 1.

Element 902c indicates that dirty data for LBA 6 (from the entry 6 of list 702 of FIG. 7) may be included in a single write operation that writes dirty data from the Flash disk cache to the PDs storing data for LUN 1.

Element 902d indicates that dirty data for LBAs 7-10 (from the entries 7-10 of list 702 of FIG. 7) may be combined into a single write operation that writes dirty data from the Flash disk cache to the PDs storing data for LUN 1. In this example, the dirty cached data of LBAs 7-10 forms a logically contiguous portion of sequential LBAs of the logical address space of LUN 1 and may therefore be written in a single write operation.

Element 902e indicates that dirty data for LBAs 11-12 (from the entries 11-12 of list 702 of FIG. 7) may be combined into a single write operation that writes dirty data from the Flash disk cache to the PDs storing data for LUN 1. In this example, the dirty cached data of LBAs 11-12 forms a logically contiguous portion of sequential LBAs from the logical address space of LUN 1 and may therefore be written in a single write operation.

Element 902f indicates that dirty data for LBAs 13-14 (from the entries 13-14 of list 702 of FIG. 7) may be combined into a single write operation that writes dirty data from the Flash disk cache to the PDs storing data for LUN 1. In this example, the dirty cached data of LBAs 13-14 forms a logically contiguous portion of sequential LBAs from the logical address space of LUN 1 and may therefore be written in a single write operation.

Thus, the example 900 indicates that dirty cache data from multiple cache pages for sequential consecutive LBAs of a LUN may be further combined to further improve the efficiency when flushing dirty data from the Flash disk cache to the PDs. In this case the number of write I/Os may be reduced from 14 write I/Os as illustrated in FIGS. 8 to 6 write I/Os as illustrated in FIG. 9.

In connection with the foregoing and with reference back to FIG. 7, an example is provided where the flushing begins with the first entry on the dirty page list 702 denoting the lowest LBA associated with a dirty cache page for a LUN. However, it should generally be noted that flushing dirty cache pages for a LUN using its dirty page list may begin with any of the dirty pages in the dirty page list. For example, referring back to FIG. 7, an embodiment may maintain a pointer or other identifier denoting a particular point in the dirty page list 702 at which flushing is to start. For example, rather than start with the first entry 702a, any entry in the list 702 may be selected from which to start flushing. The particular point in the list 702 at which flushing begins may be determined using any suitable criteria. For example, in one embodiment, an entry on the list 702 from which to begin flushing may be selected as an entry that has not been recently used, for example, which is the least recently used dirty cached page.

To further illustrate, as described above, the end 706b of the list 706 is the least recently used dirty data and the end 706a of the list is the most recently used dirty data. An embodiment in accordance with techniques herein may use the LRU list 706 ordering in combination with the dirty page list 702 to determine an order in which to flush or write dirty data from the Flash disk cache to the PDs 314. Beginning with the least recently used entry of the LRU list 706, the LRU list may be traversed in LRU order (e.g., from entry 706b to 706a) to determine a first entry that includes dirty data. In this case, entry 706b for LBA 1 includes dirty data. The dirty page list 702 may then be traversed to look for LBA 1 and determine if there are sequential consecutive LBAs that may be combined with LBA 1. In this case, LBAs 1-6 may be combined so a first write may be issued combining dirty data of these 6 LBAs.

Processing may then continue to traverse the LRU list 706 for the next dirty page which is for LBA 13. At this point, the dirty page list 702 may be searched to locate LBA 13 and determine if there are other LBAs having dirty cache data in the Flash data cache where LBA 13 and the other LBAs from a contiguous sequential range of logical addresses. For example, assume that dirty data for up to 6 contiguous sequential LBAs may be combined into a single write operation. In this case, the dirty page list 702 indicates that dirty data for LBAs 9-14 may be combined into a single write operation. Dirty data for LBAs 9-14 may be combined into a second write operation to flush dirty data for these LBAs to the PDs 314.

Continuing with this example, processing may then further traverse LRU list 706 for the next dirty page that has not yet been flushed. So far, in the previous two writes, dirty data for LBAs 1-6 and 9-14 have been flushed whereby the LRU list 706 now only includes entries for LBAs 7 and 8. Thus, processing may locate the entry in the LRU list 706 for LBA 7 and determine if there are other LBAs having dirty cache data in the Flash data cache where LBA 7 and the other LBAs from a contiguous sequential range of logical addresses. In this case, the dirty page list 702 indicates that dirty data for LBAs 7-8 may be combined into a single write operation. Dirty data for LBAs 7-8 may be combined into a third write operation to flush dirty data for these LBAs to the PDs 314.

Thus the foregoing illustrates searching the LBA sorted dirty page list 702 for multiple pages of dirty data that form a consecutive sequential chunk that may be combined into a single write operation. The dirty page list 702 may searched in an LRU order based on the LRU list 706 to look for multiple consecutive sequential LBAs having dirty data stored in the Flash disk cache where such dirty data for the LBAs may be combined into a single write operation to flush dirty data to the PDs from the Flash disk cache.

Thus, the dirty page list may be searched in an order based on the Flash disk cache eviction policy, such as LRU, to look for sequential consecutive dirty data portions that may be combined into a single write operation for flushing data to the PDs from the Flash disk cache.

What will now be described are other ways in which I/O operations may be combined such as in connection with a read cache miss and a write cache miss with respect to the Flash disk cache. For purposes of illustration, assume that write caching of the primary data cache, the DRAM cache 312 is enabled.

Figure 10:
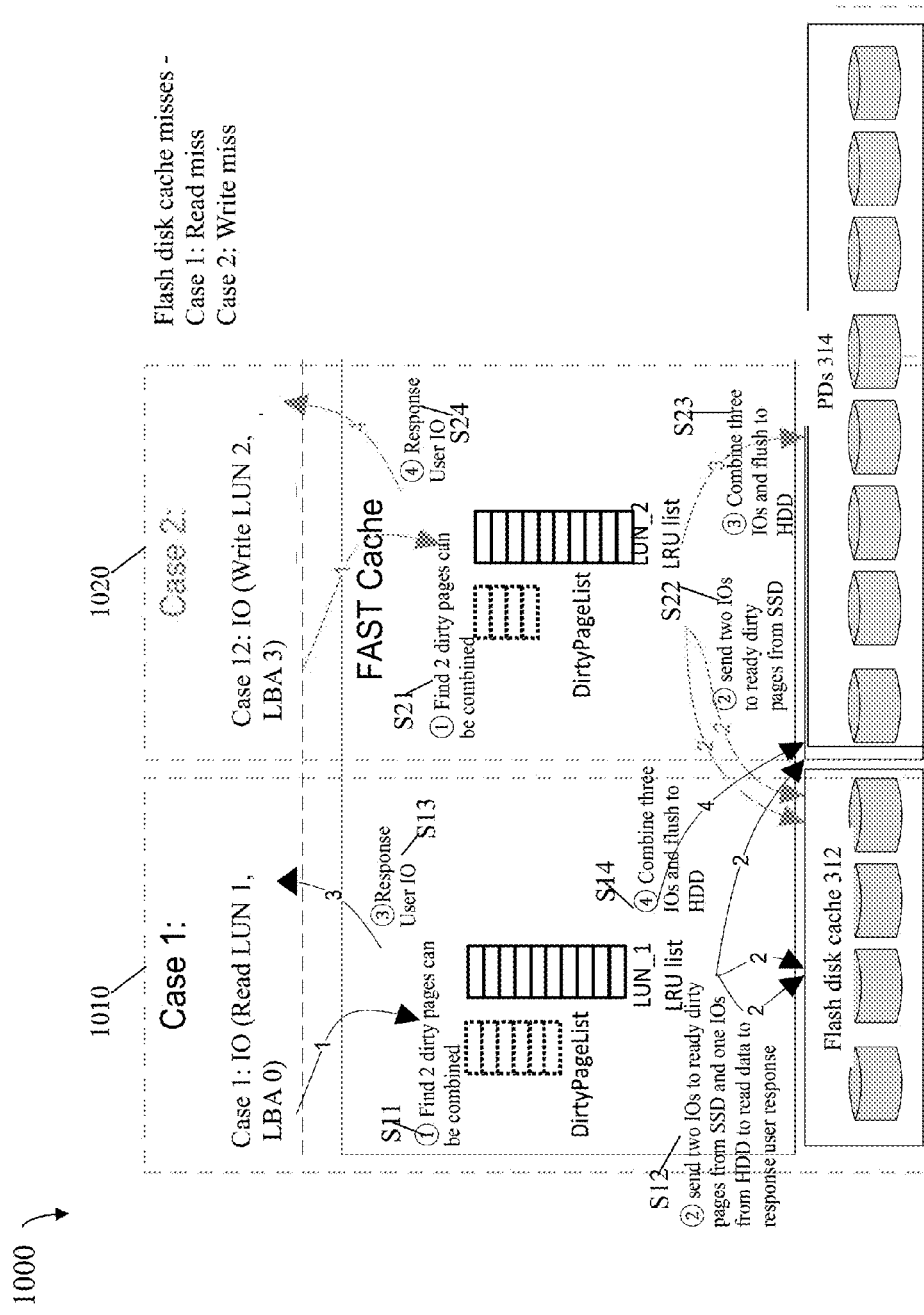

Reference is made to FIG. 10 illustrating two examples of cache miss processing that may be performed with respect to the Flash disk cache. In the first case 1 1010, a read I/O is received by the Flash disk cache where the requested read data is not in the Flash disk cache (resulting in a read miss with respect to the Flash disk cache). In the second case 2 1020, a write I/O is received by the Flash disk cache which writes data to a particular LUN LBA where the Flash disk cache does not currently include any cached data for the particular LUN LBA (resulting in a write miss with respect to the Flash disk cache).

In connection with example Case 1 1010, assume a host read is received that reads data from LUN 1, LBA 1 where the host read results in a read cache miss with respect to the primary data cache, DRAM cache 310. Subsequently, as noted elsewhere herein, the host read is received by the Flash disk cache where processing may be performed to determine whether the Flash disk cache has stored therein data for LUN 1, LBA 1 that may be used to service the read operation. If the Flash disk cache does not include data for LUN 1, LBA 1, a read cache miss results and read request will be forwarded to the PDs 314 to retrieve the requested read data for LUN 1, LBA 1 from the PDs to service the host read. In this case, code of the flash disk cache layer (such as code that manages the Flash disk cache) may perform processing to determine in step S11 whether there is any dirty cache page(s) of neighboring LBAs near LBA 1 (e.g., whether the Flash disk cache includes dirty data for any LBA(s) consecutively located with respect to LBA 1, such as LBA 0 or LBA 2). In this example, assume that step S11 determines the Flash disk cache includes dirty cached data for LBAs 1 and 2 of LUN 1. In step S12, two reads may be performed to read the dirty data for LUN 1, LBAs 1 and 2 from the Flash disk cache. Additionally in step S12, a third read may be performed to read the requested host read data for LUN 1, LBA 1 from the PDs. In step S13, the requested read data for LUN 1, LBA 1 may be returned to the requesting host. In step S14, a single combined write I/O may be formed by cache management code managing the Flash disk cache that writes data to the PDs. The single combined write includes the dirty data for LUN 1, LBAs 0 and 2 (as read from the Flash disk cache in step S12) with the data for LUN 1, LBA 1 as read from the PDs (as in step S12). The foregoing combine write data may be temporarily stored in memory at a location that is written out to the PDs 314. In summary, the foregoing Case 1 performs 3 reads (e.g., 2 reads to read the dirty data for LUN 1, LBA 0 and 2 from the flash disk cache, and a read to read data for LUN 1, LBA 1 from the PDs) and 1 write (e.g., to write out the combined write data for LUN 1, LBAs 0-2). The foregoing may be contrasted with other processing which may perform 3 reads and 2 writes to flush the dirty data for LUN 1, LBA 0 and LBA 2 as 2 separate writes. Thus, an embodiment in accordance with techniques herein may take advantage of the fact that the read miss data for LUN 1, LBA 1 has to be obtained from the PDs to service the host read. This host read data as described may be temporarily stored in a buffer in memory and then combined with the dirty data for LUN 1, LBA 0 and 2 to form a contiguous LBA range from LBA 0-2, whereby such combined data for LUN 1, LBA 0-2 is then written out to the PDs.

In connection with example Case 2 1020, assume a write is received that writes to LUN 2, LBA 3. The write data may be initially stored in the DRAM cache 310 where the write I/O of case 2 1020 may be received by the Flash disk cache at some later point in time when the write data is being destaged from the DRAM cache 310. Alternatively, if the write caching is disabled whereby write data is not written to the DRAM cache 310, the write I/O of case 2 1020 may be directly forwarded to the Flash disk cache layer for processing.

In either case, when the write I/O data is received by the Flash disk cache, processing may be performed to determine whether the Flash disk cache has stored therein data for LUN 2, LBA 3. Assume in this example that the Flash disk cache does not include data for LUN 2, LBA 3 thereby resulting in a write cache miss where the write I/O data will be forwarded to the PDs 314 to be written out thereto. In this case, code of the flash disk cache layer (such as code that manages the Flash disk cache) may perform processing to determine in step S21 whether there is any dirty cache page(s) of neighboring LBAs that may be combined with the write data whereby the dirty data from the Flash cache may be combined with the write data from LUN 2, LBA 3 into a single write operation. In this example, assume that step S21 determines the Flash disk cache includes dirty cached data for LBAs 2 and 4 of LUN 2. In this case, a single write operation may be formed which includes data for 3 consecutive LBAs (2-4) of LUN 2—the write data for LUN 2, LBA 3 along with the dirty data for LUN 2, LBAs 2 and 4 from the Flash disk cache. Thus, at step S22 two reads may be performed to read the two cached pages including dirty data for LUN 2, LBA 2 and LBA 4 from the Flash disk cache. In step S23, the write data for LUN 2, LBA 3 may be combined with the retrieved dirty data for LUN 2, LBAs 2 and 4 into a single write operation to write data for LUN 2, LBAs 2-4 to the PDs 314. In step S24, if the write caching is disabled whereby storing the write data into the DRAM cache has been skipped, a response may be sent to the user confirming that the write data to LUN 2, LBA 3 has been out to the PDs and the write is complete.

In summary, the foregoing Case 2 performs 2 reads to read the dirty data from the flash disk cache and a single write operation to write the combined data to the PDs. The foregoing may be contrasted with other processing which does not seek to combine flushing dirty cache data with write data upon an occurrence of a Flash cache miss with respect to the write data. Such other processing not using techniques herein may, for example, result in performing a total of 2 reads and 3 writes to both flush the dirty cached data for LUN 2, LBA 2 and 4 to the PDs (e.g., 2 reads and 2 writes) and also write out the user write data (1 write).

Thus the foregoing cases 1 and 2 of FIG. 10 illustrate an optimization that may be performed in an embodiment in accordance with techniques herein to flush dirty cache data in connection with data of the I/O path for reads and writes whereby a reduction in I/O operations to the back-end PDs results when forming an aggregate or combined write operation including dirty data from multiple cached pages for multiple LBAs.

Figure 11:
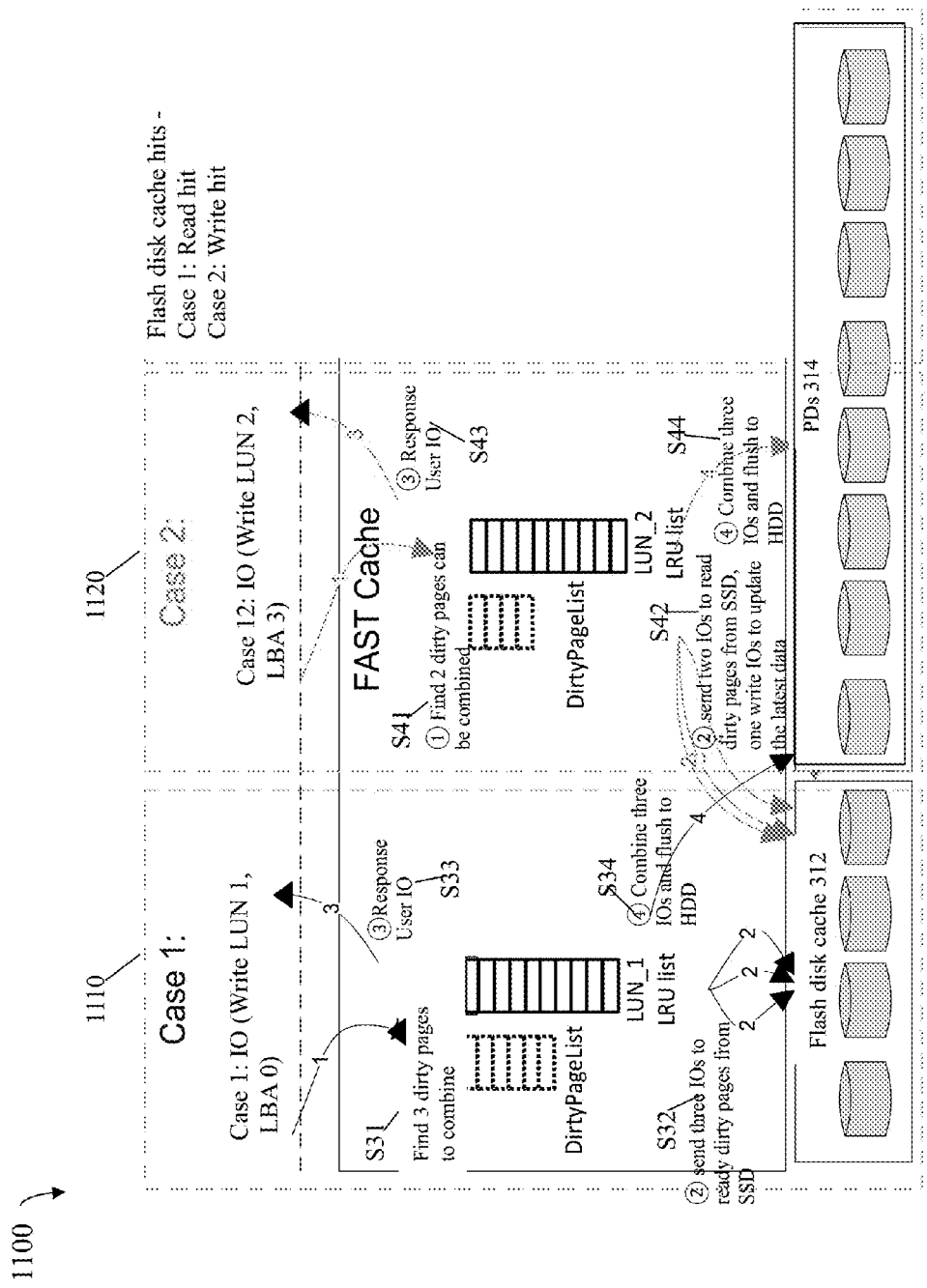

Reference is made to FIG. 11 illustrating two examples of cache hit processing that may be performed with respect to the Flash disk cache. In the first case 1 1110, a read I/O is received by the Flash disk cache where the requested read data is in the Flash disk cache (e.g., the read location (LUN, LBA from which data is read) is currently indicated as promoted to the Flash disk cache from the PDs where the read data for the read location is "clean" and stored in the Flash disk cache and results in a read hit with respect to the Flash disk cache). In the second case 2 1120, a write I/O is received by the Flash disk cache which writes data to a particular LUN LBA where the Flash disk cache does currently include cached data for the particular LUN LBA (e.g., the target write location (LUN LBA to which data is written) is currently indicated as promoted to the Flash disk cache where the Flash disk cache currently includes data for the target write location resulting in a write hit with respect to the Flash disk cache).

In the first case 1110, the read I/O requests to read data from LUN 1, LBA 1. The DRAM cache 310 results in a read cache miss and thus falls through to the Flash disk cache layer to determine whether the read can be serviced using data currently stored in the Flash disk cache. A determination is made as to whether the requested read data for LUN 1, LBA 1 is currently stored in the Flash disk cache. If not, processing requests the read data from the PDs to service the read. In this example, a determination is made that the requested read data for LUN 1, LBA 1 is in the Flash disk cache (e.g., includes a clean copy of the read data) resulting in a read cache hit. In this case, the read data for LUN 1, LBA 1 stored in the Flash disk cache may be used to service the read operation. The read data in the Flash disk cache may be dirty. In step S31, processing is performed to determine whether there are any other dirty cached pages having associated LUN LBAs that are consecutively located with respect to LUN 1, LBA 1 (e.g., so that the dirty cached pages can be combined with read data for LUN 1, LBA to form a single contiguous set of LBAs for LUN 1). In this example, assume that dirty cached data is included in the Flash disk cache for LUN 1, LBA 0 and also LUN 1, LBA 2. In this case, processing is performed in step S32 for 3 reads from the Flash disk cache—1 read to obtain the read data for LUN 1, LBA 1 and also to obtain the dirty data for LUN 1, LBA 0 and also the first data for LUN 1, LBA 2. In step S33, the read data for LUN 1, LBA 1 may be returned to the host. In step S34, a single combined write may be formed including the data for LUN 1, LBAs 0-2. Thus, processing in accordance with techniques herein may result in 3 reads and a single aggregate or combined write as noted above. This may be contrasted without performing such techniques, for example, where 3 reads and 2 writes may be performed. In this latter instance not using techniques herein for case 1 1110, the dirty data cached for LUN 1, LBA 0 and 2 may be each be written or flushed to the PDs from the Flash disk case using separate writes as opposed to the more efficient combined single write operations as noted above.

In the second case 1120, the write I/O requests to write data to LUN 2, LBA 3. In the example described herein, the DRAM cache may be performing processing to destage data for LUN 2, LBA 3 and the Fast cache may receive this write data. At this point, the Flash disk cache receives the write data for LUN 2, LBA 3 where processing is performed to determine whether the Flash disk cache includes data for LUN 2, LBA 3. If not, the write data is forwarded to the PDs to be written out. In this example, assume that the Flash disk cache receives the write data for LUN 2, LBA 3 where it is determined that the Flash disk cache includes data for LUN 2, LBA 3 resulting in a write cache hit with respect to the Flash disk cache. In step S41, processing is performed to determine whether there are any dirty cached page(s) having associated LUN LBAs that are consecutively located with respect to LUN 2, LBA 3 (e.g., so that the dirty cached pages can be combined with write data for LUN 2, LBA 3 to form a single contiguous set of LBAs for LUN 2). In this example, assume that dirty cached data is included in the Flash disk cache for LUN 2, LBA 2 and also LUN 2, LBA 4. In this case, processing is performed in step S42 for 2 reads from the Flash disk cache—1 read to obtain the dirty data for LUN 2, LBA 2 and a second read to also obtain the dirty data for LUN 2, LBA 4. Step S42 may also include performing a write to the Flash disk cache to store the write data of LUN 2, LBA 3 per the write I/O request received. In step S43, a response may be sent to the user indicating that the write I/O operation to LUN 2, LBA 3 has completed. In step S44, a single combined write may be formed including the data for LUN 2, LBAs 2-4. Thus, processing in accordance with techniques herein may result in 2 reads (to read the dirty cached data for LUN 2, LBAs 2 and 4) and 2 writes (1 write to the Flash disk cache to update the Flash disk cache with the latest write data for LUN 2, LBA 3 and 1 write to the PDs that is the single aggregate or combined write as noted above). This may be contrasted without performing such techniques, for example, where 3 reads and 3 writes may be performed. In this latter instance not using techniques herein for case 2 1120, the dirty data cached for LUN 2, LBA 2 and 4 may be each be written or flushed to the PDs from the Flash disk case using separate writes as opposed to the more efficient combined single write operations as noted above.

Thus the foregoing cases 1 and 2 of FIG. 11 illustrate an optimization that may be performed in an embodiment in accordance with techniques herein to flush dirty cache data in connection with data of the I/O path for reads and writes whereby a reduction in I/O operations to the back-end PDs results when forming an aggregate or combined write operation including dirty data from multiple cached pages for multiple LBAs.

What will now be described are flowcharts of processing steps that may be performed in an embodiment in accordance with techniques herein summarizing processing as described above.

Figure 12:
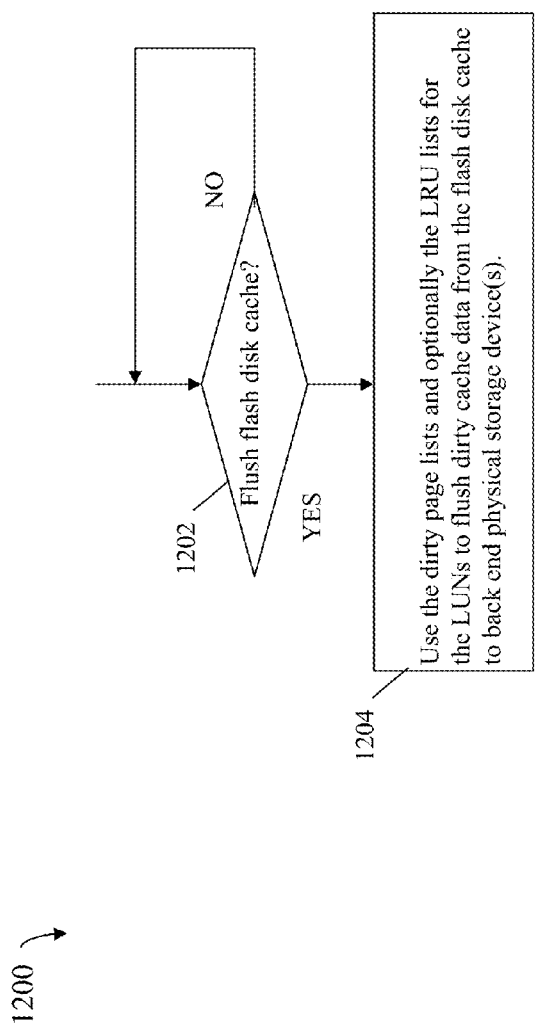
FIGS. 12 and 13 are flowcharts of processing steps that may be performed in an embodiment in accordance with techniques herein.

Referring to FIG. 12, shown is a first flowchart 1200 of processing steps that may be performed in an embodiment in accordance with techniques herein. At step 1202, a determination is made as to whether to flush the flash disk cache. Control remains at step 1202 until step 1202 evaluates to yes and the processing proceeds to step 1204. At step 1204, processing may be performed which use the dirty page lists, and optionally the LRU lists, for the LUNs to flush dirty cache data from the flash disk cache to back end physical storage device(s).

Figure 13:
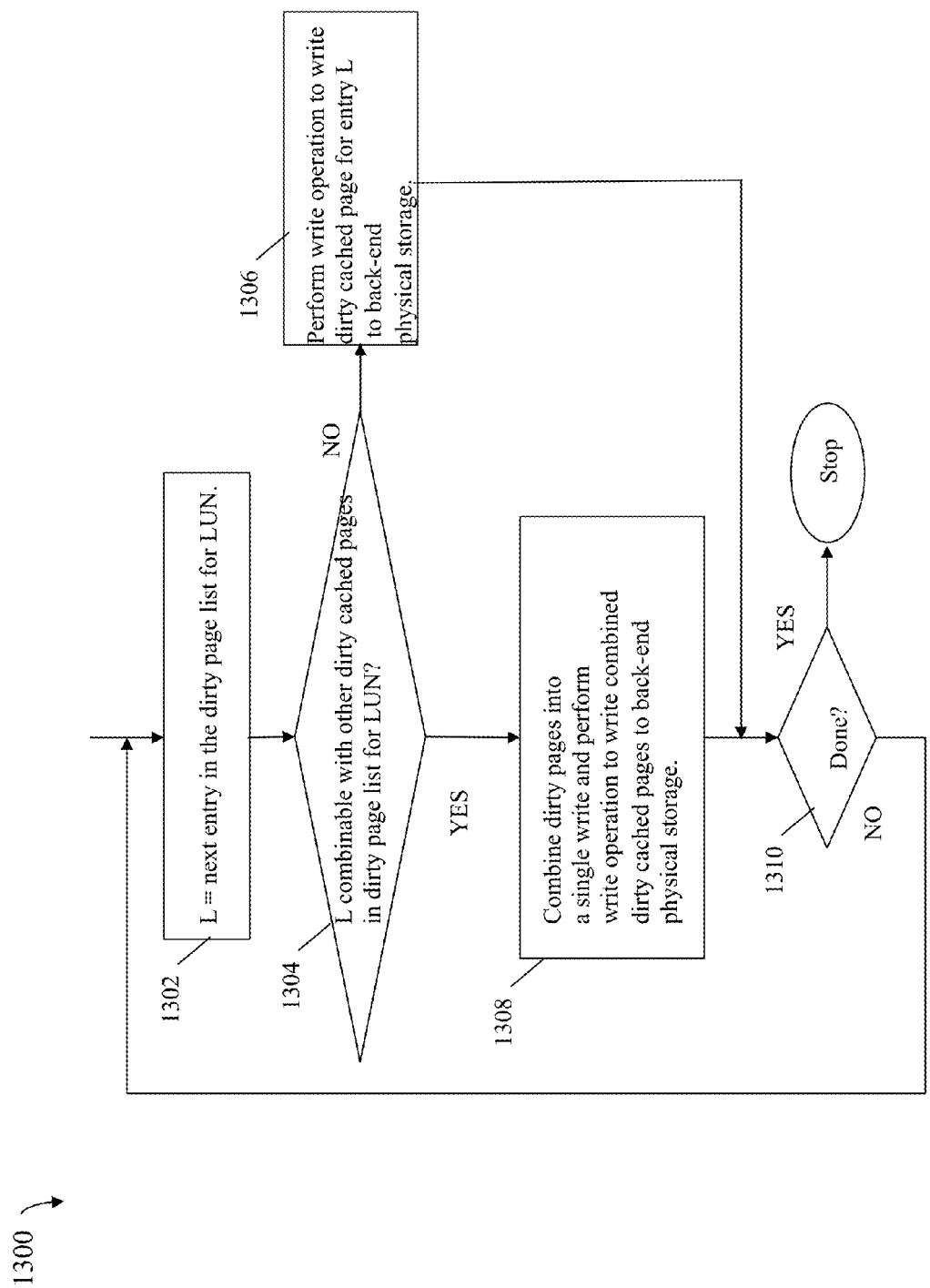

Referring to FIG. 13, shown is a second flowchart 1300 of processing steps that may be performed in an embodiment in accordance with techniques herein. The flowchart 1300 illustrates processing that may be performed in one embodiment in connection with traversing the dirty page list for a single LUN. The processing of 1300 may be repeated with respect to multiple dirty pages lists for multiple LUNs. At step 1302, L is assigned the next entry in the dirty page list for the LUN. At step 1302, a determination is made as to whether the dirty cache page of entry L of the list is combinable with other dirty cached pages of the dirty page list for the LUN. As described elsewhere herein, combinable dirty cached pages form a list of consecutive LBAs of the LUN. If step 1304 evaluates to no, control proceeds to step 1306 to perform a write operation to write the dirty cached page for entry L to back end physical storage. Control proceeds to step 1310. If step 1304 evaluates to yes, control proceeds to step 1308 where processing is performed to combine the combinable dirty pages into a single write and perform a write operation to write the combined dirty cached pages to back-end physical storage. Control then proceeds from step 1308 to step 1310. At step 1310, a determination is made as to whether all entries in the current LUN's dirty page list have been processed. If so, processing stops. Otherwise, if step 1310 evaluates to no, control proceeds to step 1302 to continue processing with the next selected entry of the LUN's dirty page list.

The techniques herein may be performed by executing code which is stored on any one or more different forms of computer-readable media. Computer-readable media may include different forms of volatile (e.g., RAM) and nonvolatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of performing cache management comprising:
   determining whether to flush dirty cached data included in a flash disk cache, wherein a plurality of caching layers includes the flash disk cache as a secondary cache and another cache as a primary cache;
   responsive to determining to flush dirty cache data from the flash disk cache, performing first processing including:
      flushing a plurality of dirty cached pages from the flash disk cache to one or more physical storage devices, wherein said plurality of dirty cached pages include data from a plurality of logical addresses of a first device, wherein the plurality of logical addresses are sorted in any of an increasing and decreasing order and included in a sorted list, and wherein said flushing includes writing the plurality of dirty cached pages in an ordering in accordance with the sorted list, wherein a data portion of the first device is stored in the flash disk cache in accordance with I/O activity directed to the data portion being at least a threshold level.

2. The method of claim 1 wherein the primary cache is a form of storage having a relatively faster performance than the flash disk cache and wherein the flash disk cache has relatively faster performance than the one or more physical storage devices.

3. The method of claim 1, wherein the first device is a first logical device having its data stored on at least one of the one or more of the physical storage devices.

4. The method of claim 1, wherein at least two of the plurality of dirty cached pages include data for at least two of the plurality of logical addresses which are consecutive.

5. The method of claim 4, wherein said flushing includes combining the at least two dirty cached pages into a single write operation that writes the at least two dirty cached pages to at least one of the one or more physical storage devices.

6. The method of claim 1, wherein a write operation directed to a logical address of the first device is received resulting in write data being stored in the primary cache and the write data not being stored in the flash disk cache because I/O activity directed to the logical address is not at least the threshold level.

7. The method of claim 6, wherein the logical address is mapped to corresponding physical storage location on a first of the one or more physical storage devices, and the method further comprising:
   receiving a set of one or more other write operations directed to the logical address;
   determining that I/O activity directed to the logical address is any of equal to or above the threshold level; and
   responsive to said determining, promoting the write data for the logical device from the first physical storage device to the flash disk cache wherein the write data is stored in the flash disk cache.

8. The method of claim 1, wherein each of the plurality of dirty cached pages includes a first copy of data for a logical address of the first device that is more recent that than a second copy of data for the logical address of the first device stored on any of the one or more physical storage devices.

9. The method of claim 1, wherein the one or more physical storage devices are rotating disk drives.

10. A method of performing cache management comprising:
    determining whether to flush dirty cached data included in a flash disk cache, wherein a plurality of caching layers includes the flash disk cache as a secondary cache and another cache as a primary cache;
    responsive to determining to flush dirty cache data from the flash disk cache, performing first processing including:
       flushing a plurality of dirty cached pages from the flash disk cache to one or more physical storage devices, wherein said plurality of dirty cached pages include data from a plurality of logical addresses of a first device, wherein the plurality of logical addresses are sorted in any of an increasing and decreasing order and included in a sorted list, and wherein said flushing includes writing the plurality of dirty cached pages in an ordering in accordance with the sorted list, wherein said flushing is performed using the sorted list and a second list of dirty cached pages for the first device, said second list denoting an ordering of cached pages for the first device based on time since last accessed.

11. The method of claim 10, wherein each entry in the sorted list is included in the second list, said second list including dirty cached pages for the first device and also include clean cached pages for the first device.

12. The method of claim 11, wherein said flushing comprises:

selecting a first dirty cached page from the sorted list based on a position of the dirty cached page in the second list.

13. The method of claim 12, wherein the sorted list is used to determine whether the first dirty cached page is combinable with one or more other dirty cached pages included in the sorted list.

14. The method of claim 13, wherein the first dirty cached page is determined as combinable with a second dirty cached page, the first dirty cached page having a first of the plurality of logical addresses and the second dirty cached page having a second of the plurality of logical addresses, the first logical address and the second logical address being consecutive logical addresses of the first device.

15. A method of performing cache management comprising:
   determining whether to flush dirty cached data included in a flash disk cache, wherein a plurality of caching layers includes the flash disk cache as a secondary cache and another cache as a primary cache;
   responsive to determining to flush dirty cache data from the flash disk cache, performing first processing including:
      flushing a plurality of dirty cached pages from the flash disk cache to one or more physical storage devices, wherein said plurality of dirty cached pages include data from a plurality of logical addresses of a first device, wherein the plurality of logical addresses are sorted in any of an increasing and decreasing order and included in a sorted list, and wherein said flushing includes writing the plurality of dirty cached pages in an ordering in accordance with the sorted list, wherein a first write operation is received at the flash disk cache, the first write operation directed to a first target location on the first device, and said flushing includes performing a second write operation that combines write data written by the first write operation with one or more of the plurality of dirty cached pages into a single write performed by the second write operation that writes to any of the one or more physical storage devices, said flushing including performing the second write operation.

16. A method of performing cache management comprising:
   determining whether to flush dirty cached data included in a flash disk cache, wherein a plurality of caching layers includes the flash disk cache as a secondary cache and another cache as a primary cache;
   responsive to determining to flush dirty cache data from the flash disk cache, performing first processing including:
      flushing a plurality of dirty cached pages from the flash disk cache to one or more physical storage devices, wherein said plurality of dirty cached pages include data from a plurality of logical addresses of a first device, wherein the plurality of logical addresses are sorted in any of an increasing and decreasing order and included in a sorted list, and wherein said flushing includes writing the plurality of dirty cached pages in an ordering in accordance with the sorted list, wherein a first read operation is received at the flash disk cache, the first read operation reading data from a first read location on the first device, and said flushing includes performing a first write operation that combines read data of the first read location with one or more of the plurality of dirty cached pages into a single write performed by the first write operation that writes to any of the one or more physical storage devices, said flushing including performing the first write operation.

17. A system comprising:
processor;
a primary cache;
a secondary cache; and
a memory comprising code stored thereon that, when executed, performs a method for cache management including:
   determining whether to flush dirty cached data included in the secondary cache; and
   responsive to determining to flush dirty cache data from the secondary cache, performing first processing including:
      flushing a plurality of dirty cached pages from the secondary cache to one or more physical storage devices, wherein said plurality of dirty cached pages include data from a plurality of logical addresses of a first device, wherein the plurality of logical addresses are sorted in any of an increasing and decreasing order and included in a sorted list, and wherein said flushing include writing the plurality of dirty cached pages in an ordering in accordance with the sorted list, wherein a data portion of the first device is stored in the flash disk cache in accordance with I/O activity directed to the data portion being at least a threshold level.

18. The method of claim 17, wherein a plurality of storage layers includes the primary cache, the secondary cache and the one or more physical storage devices, said primary cache having a highest relative performance ranking of the plurality of storage layers, the secondary cache having a relative performance ranking below the primary cache, and the one or more physical storage devices having a relative performance ranking less than the secondary cache.

19. A non-transitory computer readable medium comprising code stored thereon that, when executed, performs a method cache management comprising:
   determining whether to flush dirty cached data included in a flash disk cache, wherein a plurality of caching layers includes the flash disk cache as a secondary cache and another cache as a primary cache; and
   responsive to determining to flush dirty cache data from the flash disk cache, performing first processing including:
      flushing a plurality of dirty cached pages from the flash disk cache to one or more physical storage devices, wherein said plurality of dirty cached pages include data from a plurality of logical addresses of a first device, wherein the plurality of logical address are sorted in any of an increasing and decreasing order and included in a sorted list, and wherein said flushing include writing the plurality of dirty cached pages in an ordering in accordance with the sorted list, wherein a data portion of the first device is stored in the flash disk cache in accordance with I/O activity directed to the data portion being at least a threshold level.

* * * * *